(12) United States Patent
MacDonald et al.

(10) Patent No.: US 11,321,697 B1
(45) Date of Patent: May 3, 2022

(54) FINANCIAL SERVICES PLATFORM WITH INTEGRATED BANKING, CREDIT, AND P2P CAPABILITIES

(71) Applicant: Step Mobile, Inc., Palo Alto, CA (US)

(72) Inventors: CJ MacDonald, Palo Alto, CA (US);
George Bowen, Palo Alto, CA (US)

(73) Assignee: Step Mobile, Inc., Palo Alto, CA (US)

( * ) Notice: Subject to any disclaimer, the term of this patent is extended or adjusted under 35 U.S.C. 154(b) by 0 days.

(21) Appl. No.: 17/555,108

(22) Filed: Dec. 17, 2021

Related U.S. Application Data

(60) Provisional application No. 63/249,542, filed on Sep. 28, 2021.

(51) Int. Cl.
| | |
|---|---|
| *G06Q 40/00* | (2012.01) |
| *G06Q 20/22* | (2012.01) |
| *G06Q 40/02* | (2012.01) |
| *G06Q 20/34* | (2012.01) |

(52) U.S. Cl.
CPC ....... *G06Q 20/2295* (2020.05); *G06Q 20/351* (2013.01); *G06Q 40/02* (2013.01)

(58) Field of Classification Search
CPC ... G06Q 40/02; G06Q 20/351; G06Q 20/2295
See application file for complete search history.

(56) References Cited

U.S. PATENT DOCUMENTS

| | | | | |
|---|---|---|---|---|
| 5,914,472 A | * | 6/1999 | Foladare ................. | G07F 7/08 |
| | | | | 235/382.5 |
| 5,953,710 A | * | 9/1999 | Fleming ............. | G06Q 20/2295 |
| | | | | 235/380 |

(Continued)

FOREIGN PATENT DOCUMENTS

GB  2487832 A  *  8/2012  ........... G06Q 20/105

OTHER PUBLICATIONS

Venmo App Lets Parents Create Debit Card for Kids (https://www.pymnts.com/news/merchant-innovation/2020/venmo-app-lets-parents-create-debit-card-for-kids/) Feb. 24, 2020 (Year: 2020).*

(Continued)

*Primary Examiner* — Asha Puttaiah
(74) *Attorney, Agent, or Firm* — Morrison & Foerster LLP

(57) ABSTRACT

A method implemented by one or more computer servers associated with a financial services platform includes receiving a request to provision a secondary user account for financial capabilities through sponsorship by a primary user account. The secondary user account can be provisioned only upon creation of the primary user account. In response to receiving a confirmation to provision the secondary user account, the method includes provisioning the primary user account and then the secondary user account. The method includes generating a credit account for the primary and secondary user accounts, and generating a deposit account for the primary user account. The primary user owns the deposit account, which holds funds to secure repayment of balances of the credit accounts. The method includes generating one virtual spending card for each of the credit accounts, in which the virtual spending cards service transactions with respect to the primary and secondary user accounts.

18 Claims, 24 Drawing Sheets

(56) References Cited

U.S. PATENT DOCUMENTS

| | | | |
|---|---|---|---|
| 2004/0230536 A1* | 11/2004 | Fung | G06Q 40/00 705/64 |
| 2005/0289057 A1* | 12/2005 | Onizuka | G06Q 20/26 705/44 |
| 2007/0017976 A1* | 1/2007 | Peyret | G07F 7/1008 235/380 |
| 2008/0177635 A1* | 7/2008 | Handel | G06Q 30/0601 705/26.1 |
| 2008/0281721 A1* | 11/2008 | Simunovic | G06Q 40/02 705/42 |
| 2009/0271211 A1* | 10/2009 | Hammad | G06Q 20/32 726/20 |
| 2010/0114733 A1* | 5/2010 | Collas | G06Q 30/0601 705/26.1 |
| 2014/0201077 A1* | 7/2014 | Cama | G06Q 20/405 705/44 |
| 2014/0214640 A1* | 7/2014 | Mallikarjunan | G06Q 20/322 705/35 |
| 2015/0058214 A1* | 2/2015 | Cohen | G06Q 20/10 705/41 |
| 2015/0136848 A1* | 5/2015 | Lynch | G06Q 20/40 235/382 |
| 2016/0092869 A1* | 3/2016 | Salama | G06Q 20/326 705/41 |
| 2020/0175500 A1* | 6/2020 | Omojola | G06K 19/0723 |
| 2020/0364690 A1* | 11/2020 | Brazier, III | G06Q 20/34 |

OTHER PUBLICATIONS

Susan Shain, 3 Ways to Get Credit Cards for Teenagers—Plus Our Favorite Strategy; (https://www.creditcardinsider.com/blog/3-ways-to-get-credit-cards-for-teenagers-plus-our-favorite-strategy/) Published Mar. 12, 2019 Updated Sep. 9, 2021 (Year: 2021).*

Ashley Dull, What is the Minimum Age for a Credit Card? 9 Best Beginner Cards, (https://www.cardrates.com/advice/minimum-age-for-credit-card/) Oct. 2, 2019 (Year: 2019).*

Perez, S. (Jun. 30, 2020). "US Challenger Bank Chime Launches Credit Builder, A Credit Card That Works More Like Debit," Tech Crunch, 9 pages, as retrieved on Jan. 11, 2022 from https://techcrunch.com/2020/06/30/u-s-challenger-bank-chime-launches-credit-builder-a-credit-card-that-works-more-like-debit/.

U.S. Appl. No. 17/555,081, MacDonald et al., filed Dec. 17, 2021. (Copy not submitted herewith pursuant to the waiver of 37 C.F.R. § 1.98(a)(2)(iii) issued by the Office on Sep. 21, 2004).

* cited by examiner

200C

PLATFORM LEDGER

| DEPOSIT ACCOUNT | SPENDING ACCOUNT | BALANCE (SPENDING CARD LIMITS) |
|---|---|---|
| MAR. 4TH: $1,000 | — | MAR. 4TH: $0 ($1,000) |
| — | MAR. 10TH: $250 [PLATFORM ACCOUNT] | MAR. 10TH: $250 ($750) |
| — | MAR. 20TH: $50 [SUB-ACCOUNT 2] | MAR. 20TH: $300 ($700) |
| — | MAR. 25TH: $300 [PLATFORM ACCOUNT] | MAR. 25TH: $600 ($400) |
| — | MAR. 30TH: $150 [SUB-ACCOUNT 2] | MAR. 30TH: $750 ($250) |
| MAR. 31ST: ($750) | —— RECONCILIATION —— | MAR. 31ST: $0 ($250) |
| APR. 1ST: $500 | — | APR. 1ST: $0 ($750) |

PLATFORM LEDGER

| DEPOSIT ACCOUNT | SPENDING ACCOUNT | | | BALANCE (SPENDING CARD LIMIT) | | |
|---|---|---|---|---|---|---|
| | PLATFORM ACCOUNT | SUB-ACCOUNT 1 | SUB-ACCOUNT 2 | PLATFORM ACCOUNT | SUB-ACCOUNT 1 | SUB-ACCOUNT 2 |
| MAR. 4TH:<br>P.A.: $500<br>S.A.: $250<br>S.A.: $250 | — | — | — | $0<br>($500) | $0<br>($250) | $0<br>($250) |
| — | MAR. 4TH:<br>$250 | — | — | $250<br>($250) | $0<br>($250) | $0<br>($250) |
| — | — | MAR. 7TH:<br>$50 | — | $250<br>($250) | $50<br>($200) | $0<br>($250) |
| — | MAR. 10TH:<br>$200 | — | — | $450<br>($50) | $50<br>($200) | $0<br>($250) |
| — | MAR. 20TH:<br>$25 | — | — | $475<br>($25) | $50<br>($200) | $0<br>($250) |
| — | — | MAR. 25TH:<br>$200 | — | $475<br>($25) | $250<br>($0) | $0<br>($250) |
| — | MAR. 30TH:<br>$20 | — | MAR. 30TH:<br>$50 | $495<br>($5) | $250<br>($0) | $50<br>($200) |
| MAR. 31ST: ($795) | ——— RECONCILIATION ——— | | | $0<br>($5) | $0<br>($0) | $0<br>($200) |
| APR. 1ST: $1,000 | — | — | — | $0<br>($505) | $0<br>($250) | $0<br>($450) |

*FIG. 2D*

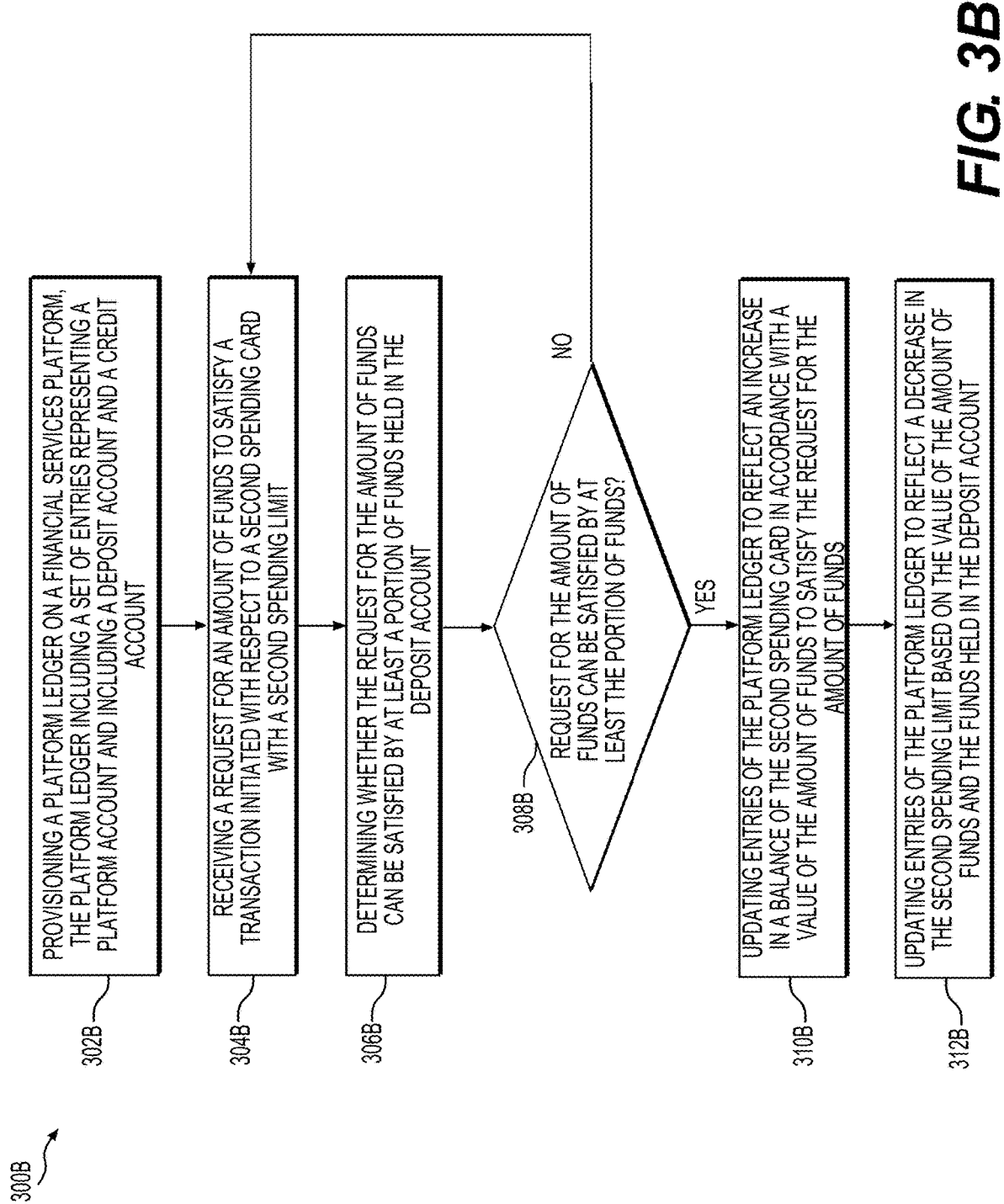

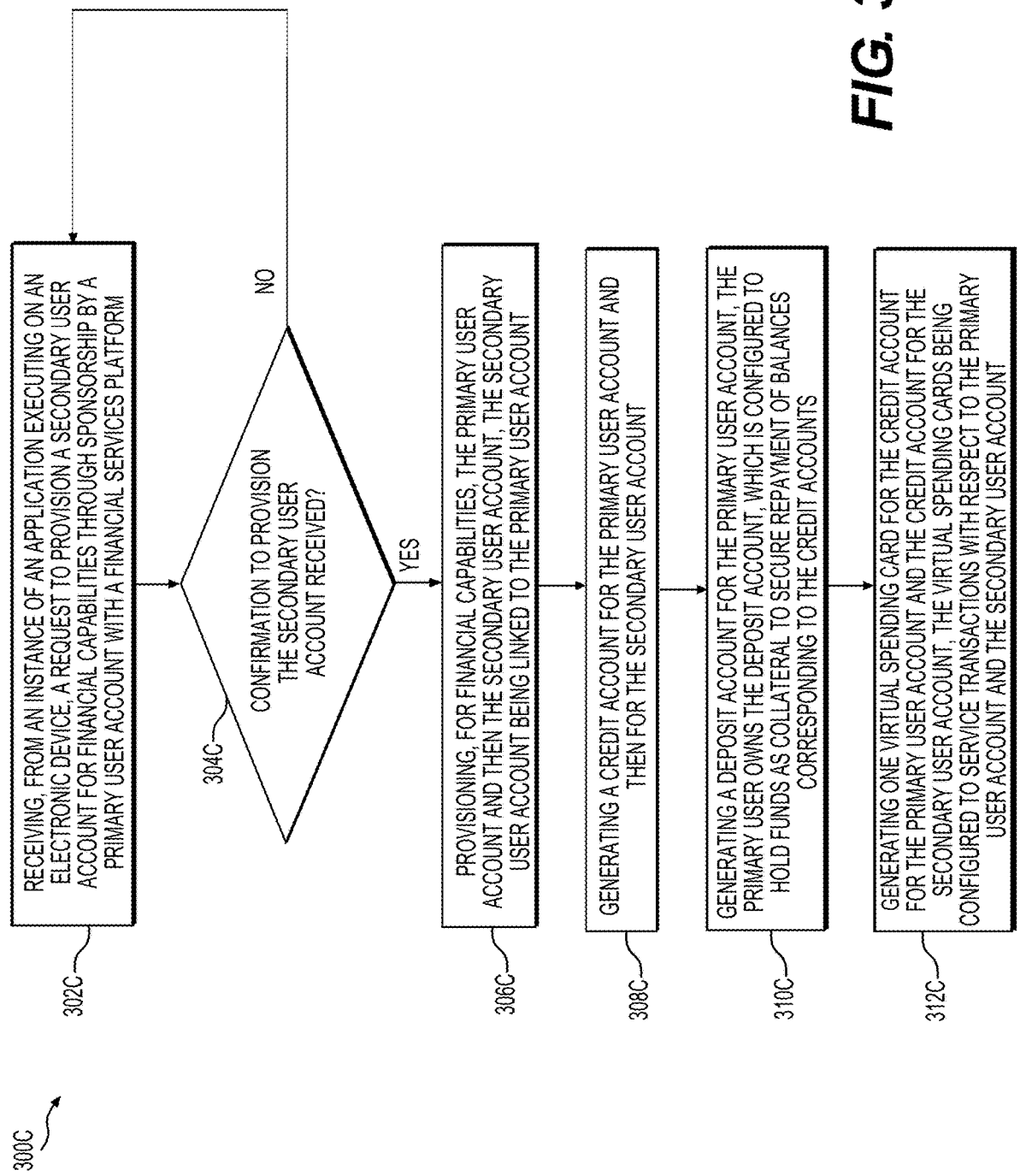

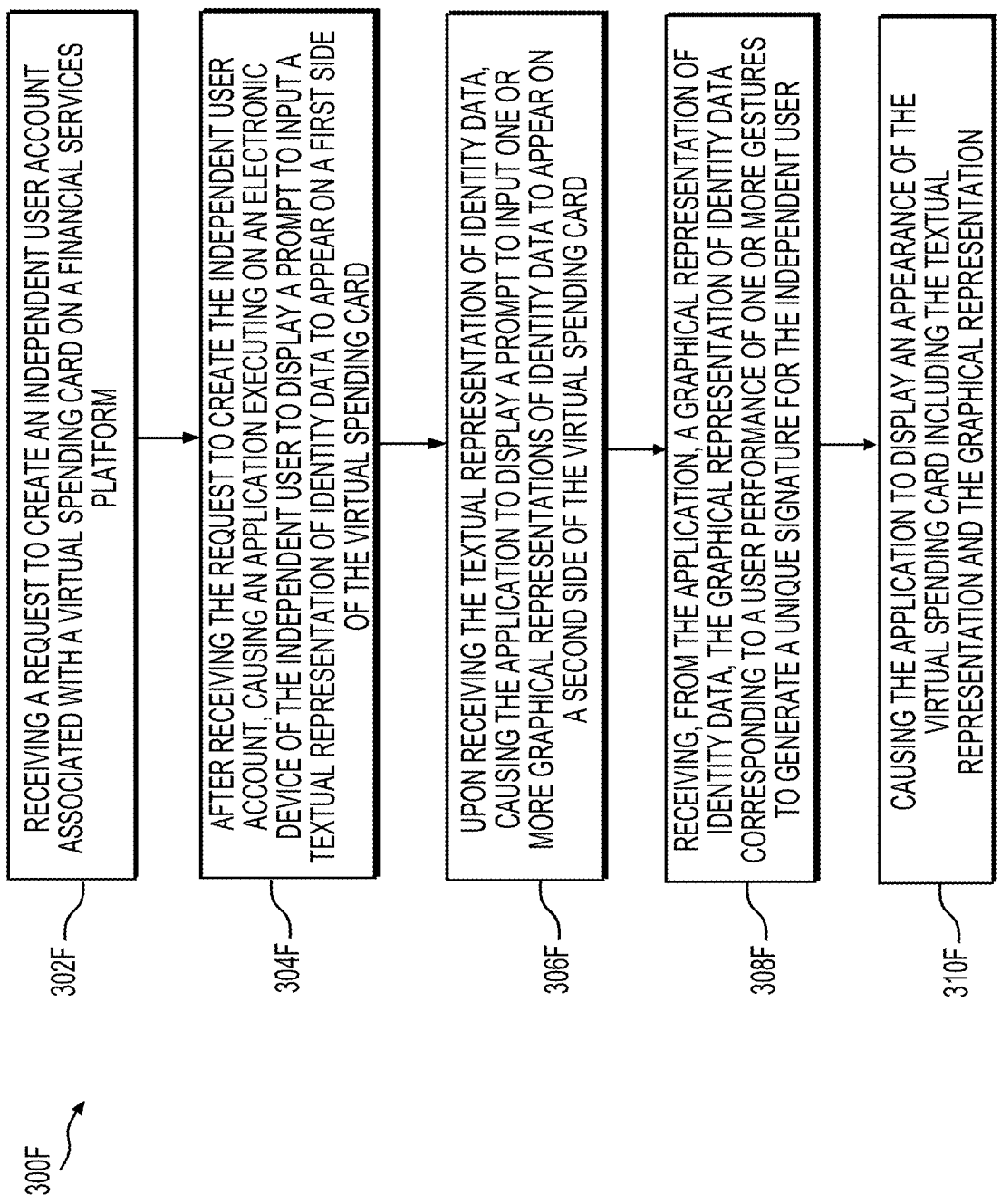

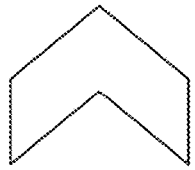

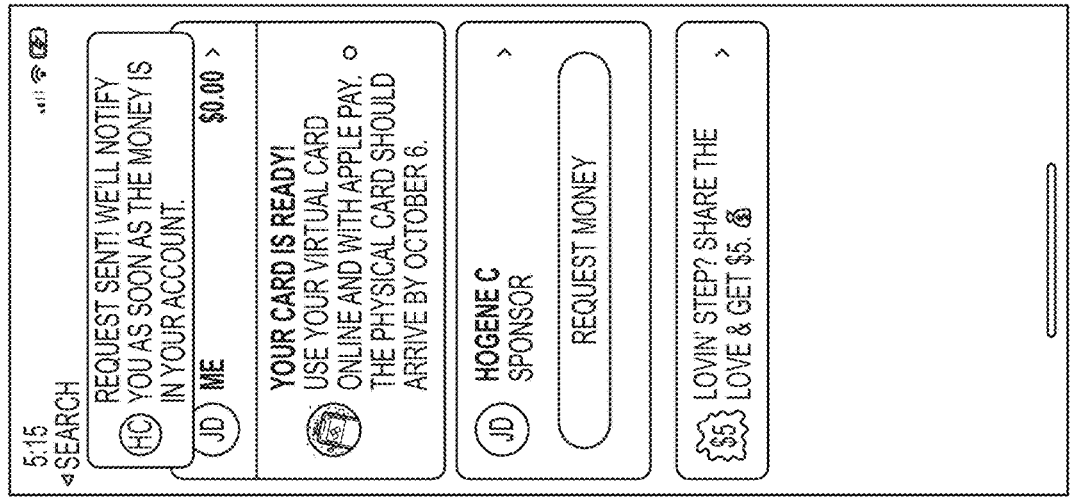
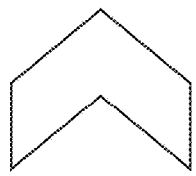
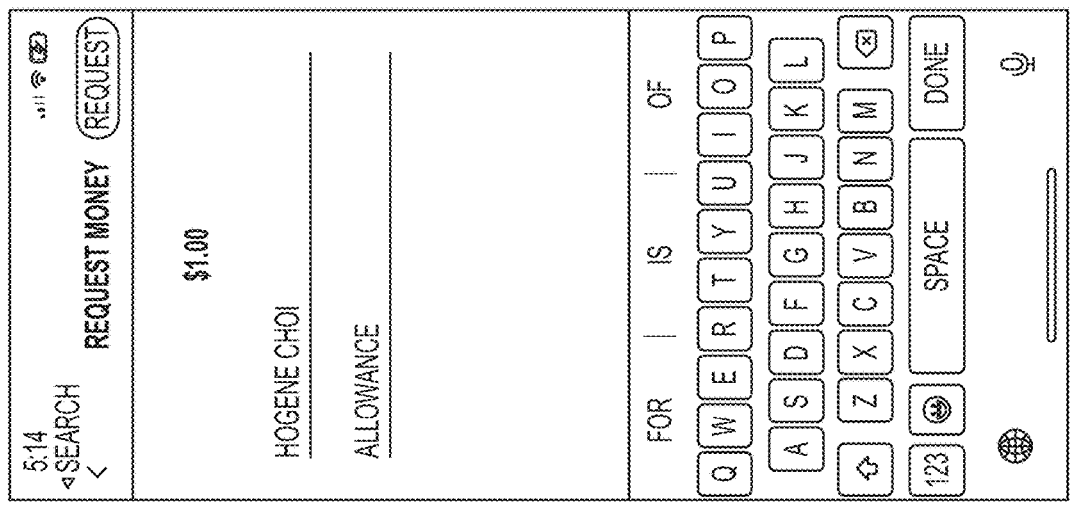
*FIG. 4X*
*FIG. 4W*

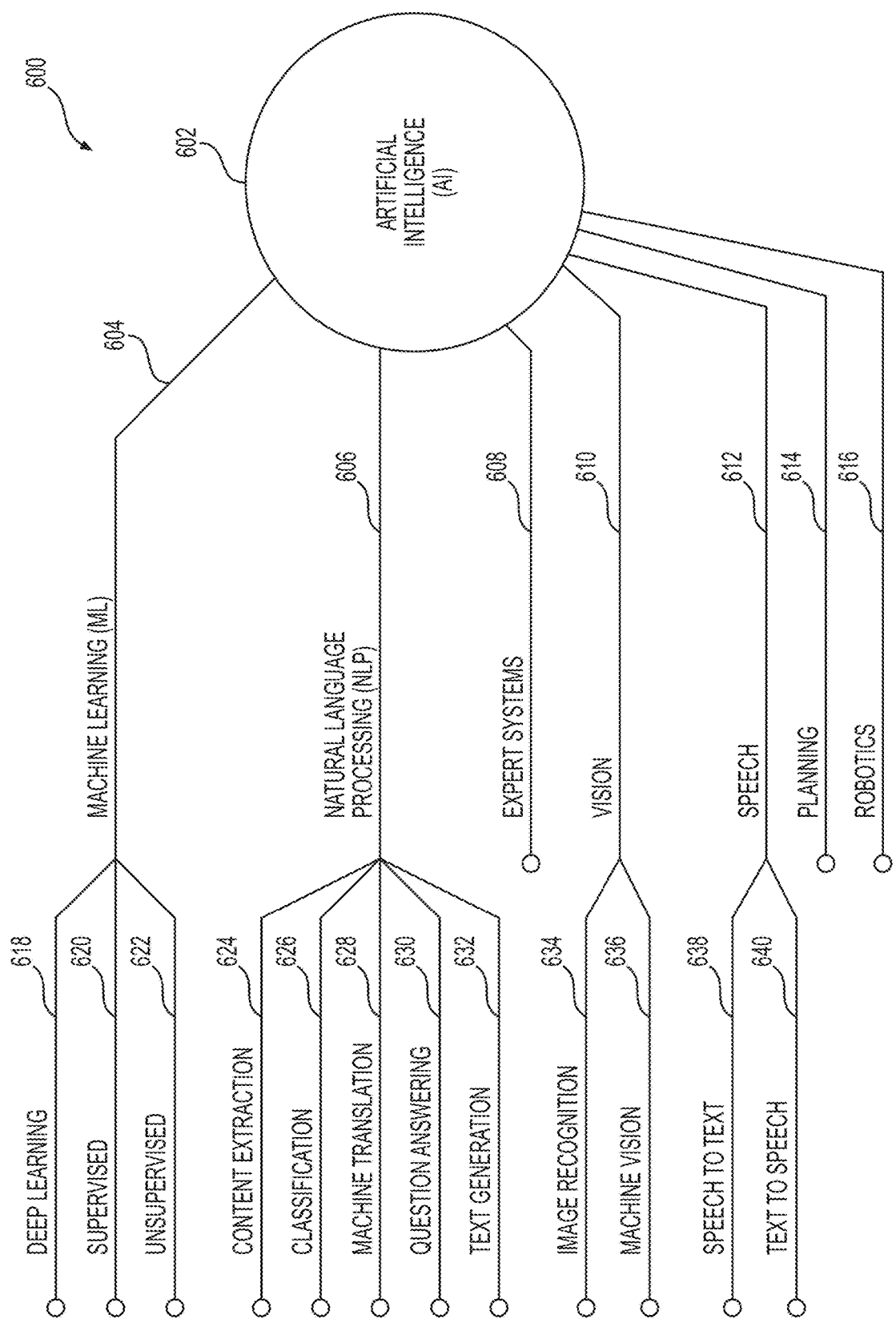

FINANCIAL SERVICES PLATFORM WITH INTEGRATED BANKING, CREDIT, AND P2P CAPABILITIES

CROSS-REFERENCE TO RELATED APPLICATIONS

This application claims the benefit under 35 U.S.C. § 119(e) of U.S. Provisional Patent Application No. 63/249,542, filed 28 Sep. 2021, which is incorporated herein by reference.

TECHNICAL FIELD

This application relates generally to financial services platforms, and, more particularly, to a financial services platform including integrated capabilities.

BACKGROUND

As global economies continue to shift away from coin and paper currencies to digital fiat currencies and cryptocurrencies, many dependent users (e.g., preteens, teenagers, and young adults) are increasingly being introduced to personal finance and money management by way of social media and mobile banking and payment applications (e.g., mobile apps). For example, many legacy financial institutions have begun introducing checking accounts designed for teenagers and high-school students, debit cards designed for preteens, teenagers, and high-school students, as well as online banking and mobile banking apps for facilitating the checking accounts and debit cards intended specifically for preteens, teenagers, or other young adults. While some legacy financial institutions may provide individual checking accounts and debit cards intended for preteens, teenagers, and young adults, others may simply provide a checking account and associated debit card that is co-owned by one or more parents or other adults who also have a checking account and associated debit card with that same financial institution. However, such youth-intended and generic checking accounts and associated debit cards may provide for only rudimentary engagement with electronic-based personal finance and money management by preteens, teenagers, and young adults.

BRIEF DESCRIPTION OF THE DRAWINGS

FIG. 2C illustrates an example diagram of a platform ledger over a one-month spending-reconciliation cycle, based on pooled deposited funds and pooled spending card limits.

FIG. 2D illustrates an example diagram of a platform ledger over a spending-reconciliation cycle, based on specific allocations of deposited funds to each sub-account and corresponding spending card limits.

FIG. 3B illustrates a flow diagram of a method for provisioning a platform account, which is associated with a deposit account and credit spending account for servicing and executing transactions.

FIG. 3C illustrates a flow diagram of a method for provisioning a secondary user account for financial capabilities through sponsorship by a primary user account with the financial services platform.

FIG. 3F illustrates a flow diagram of a method for designing and assigning one or more virtual cards for an independent user.

Figures 4N, 4O, 4P:
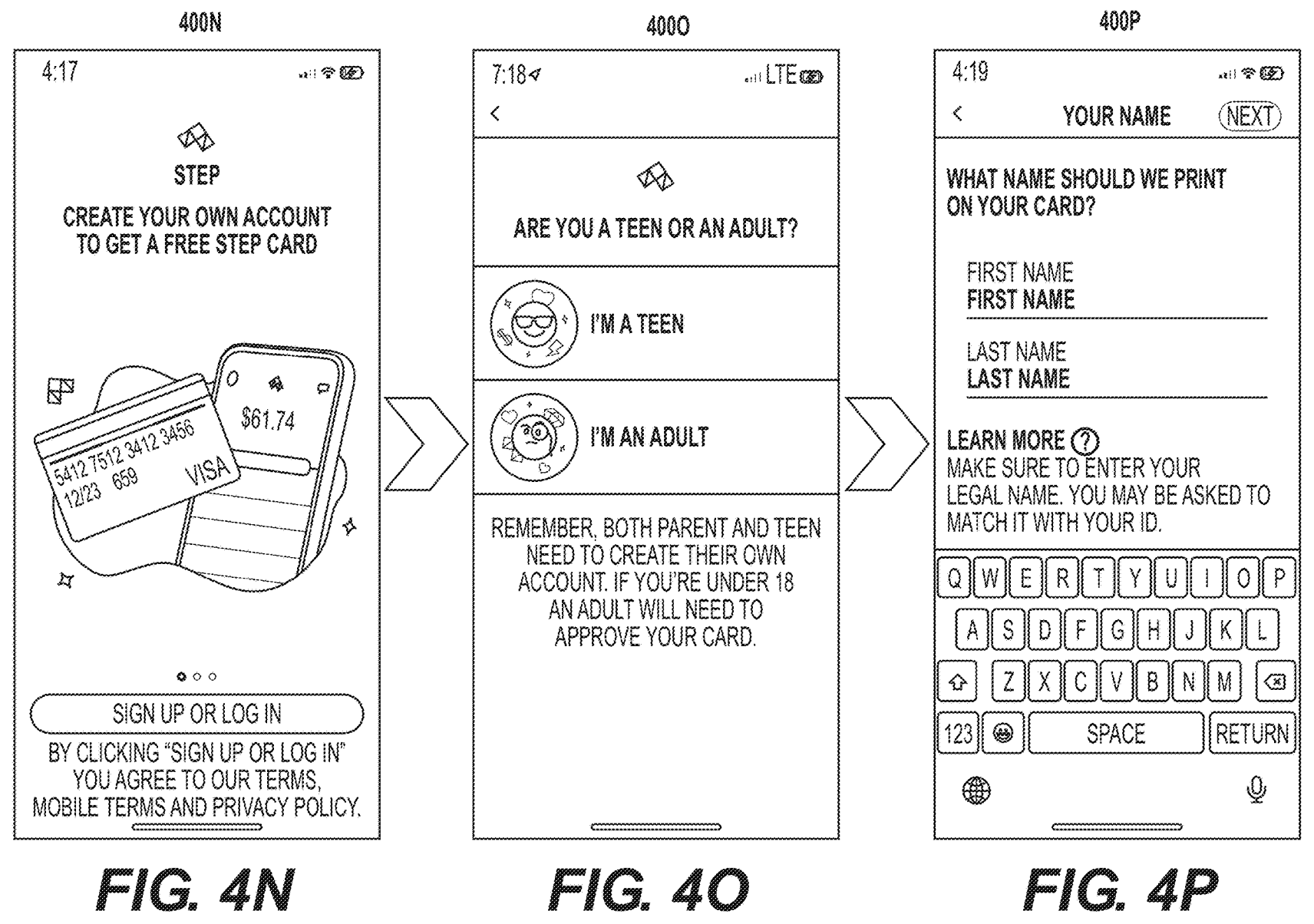

FIGS. 4A-4M illustrate one or more running examples of provisioning a platform account and prompting an authorized user to be joined to the platform account by creating a sub-account.

FIGS. 4N-4X illustrate one or more running examples of creating a sub-account and prompting an account owner to allow provisioning of the sub-account by creating and provisioning a platform account.

FIG. 6 illustrates a diagram of an example artificial intelligence (AI) architecture included as part of the financial services platform.

DESCRIPTION OF EXAMPLE EMBODIMENTS

Figure 1:
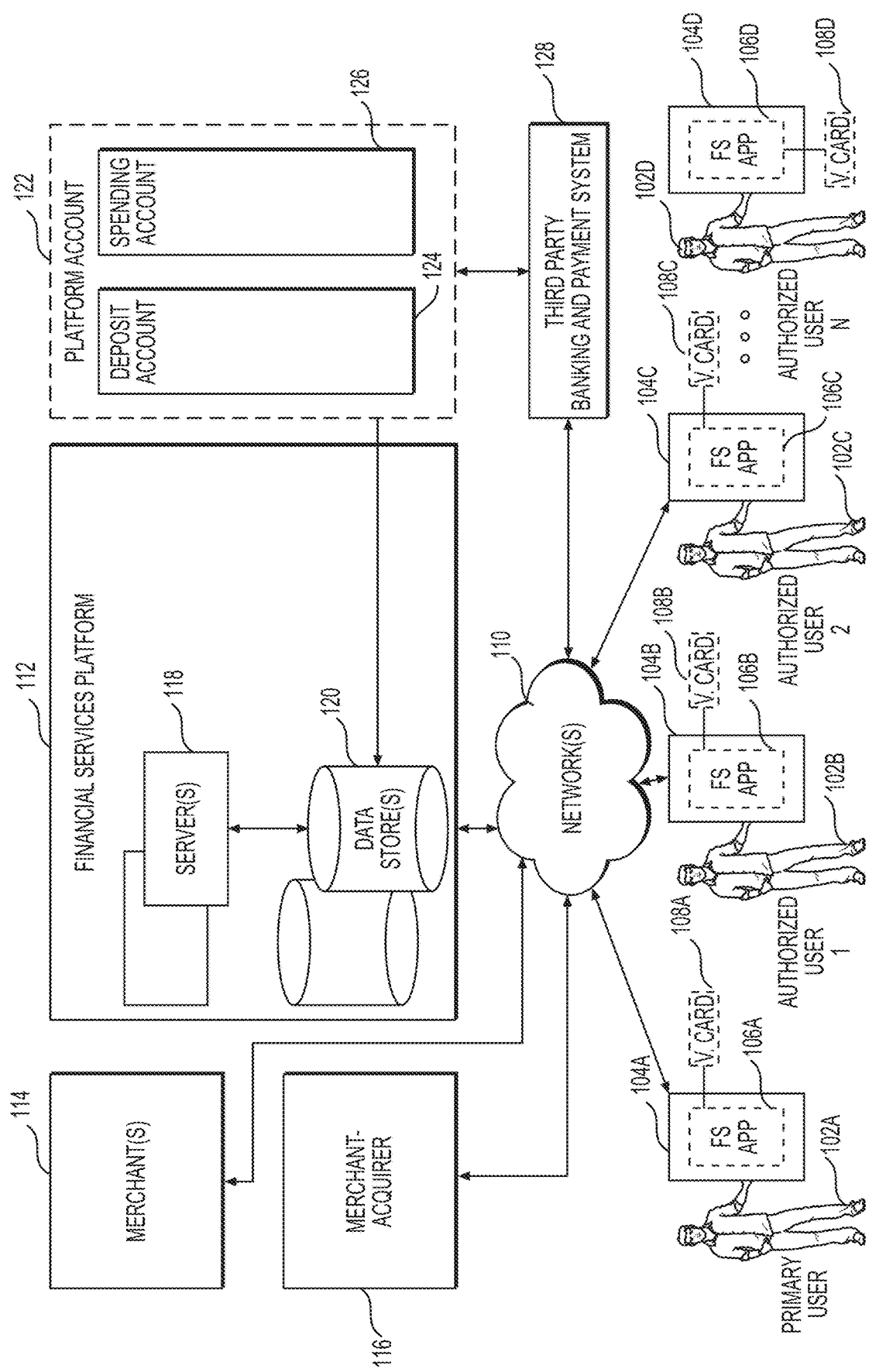
FIG. 1 illustrates a financial services platform and network environment.

As global economies continue to shift away from coin and paper currencies to digital fiat currencies and cryptocurrencies, many "dependent users" (e.g., which may include preteens, teenagers, young adults, adults under conservatorship or guardianship, high-school students, and so forth) are increasingly being introduced to personal finance and money management by way of social media and mobile banking and checking applications (e.g., mobile apps). For example, many legacy financial institutions have begun introducing checking accounts designed for teenagers and high-school students, debit cards designed for preteens, teenagers, and high-school students, as well as online banking and mobile banking apps for facilitating the checking accounts and debit cards intended for preteens, teenagers, or other young adults. While some legacy financial institutions may offer individual checking accounts and debit cards intended specifically for preteens, teenagers, and young adults (e.g., including predesignated lower withdrawal limits, overdraft protection, and lower daily transaction limits), others may simply provide a checking account and associated debit card that is co-owned by one or more parents or other adults who also have a checking account and associated debit card with that same financial institution. However, such youth-intended and generic checking accounts and associated debit cards may provide for only rudimentary engagement with electronic-based personal finance and money management by preteens, teenagers, and young adults.

For example, some of the more decisive factors for achieving an exemplary personal finance and money management profile for many preteens, teenagers, and young adults may generally include establishing an individual credit history (e.g., managing spending, transactions, bill payments, and utilization of one or more lines of credit; managing user debt-to-income ratio, and so forth), ensuring financial data security (e.g., protection from potential financial data theft or identity theft, fraudulent transactions, and so forth), and the ability to independently manage and engage with electronic spending accounts with limited oversight (e.g., limited oversight of parents or other adults to allow preteens, teenagers, and young adults to develop and foster their own financial responsibility).

However, generic checking accounts and associated debit cards—while useful for making deposits, receiving direct deposits, withdrawing funds, or transferring money to other accounts—are generally technically incapable platforms for generating credit card spending accounts for users before reaching adult age; monitoring and determining creditworthiness and enabling individual users to establish a "good" credit history before reaching adult age; generating a platform-based and data-driven credit score or other meaningful credit history marker for individual users before reaching adult age; providing runtime determination of spending allocations or limits for credit card spending accounts and payment transfers from a singular primary account to each of a number of interlinked and independently managed sub-accounts; providing runtime security features, such as generating separate and unique account numbers between accounts and sub-accounts and between virtual spending cards and physical credit cards for the same accounts and/or sub-accounts; among various other technical advantages as disclosed herein.

Indeed, it may be useful to provide a youth-directed financial services platform and accompanying financial services mobile application that allows an account owner and authorized users to individually provision, engaged with, and manage interlinked primary and sub-accounts suitable for enabling dependent users (e.g., which may include preteens, teenagers, young adults, adults under conservatorship or guardianship, high-school students, and so forth to establish an individual credit history and the ability to manage and utilize deposit accounts and credit card spending accounts to execute point-of-sale (PoS) transactions at merchants, peer-to-peer (P2P) payment transfers to one or more other users, or other deposit-secured transactions.

Accordingly, the present embodiments are directed toward a financial services platform for provisioning a primary platform account and interlinked secondary sub-account(s), which are each associated with individual credit card spending accounts for servicing and executing transactions with respect to the provisioned primary platform account and linked secondary sub-account(s). In particular embodiments, one or more computer servers associated with the financial services platform may receive from a first instance of an application executing on a first electronic device associated with a first user a first request to provision a secondary user account with the financial services platform. For example, in particular embodiments, the first user may include an authorized user (e.g., dependent user, such as a preteen user, a teenaged user, or similar user under adult age or otherwise adults under conservatorship or guardianship) that may launch an instance of the financial services mobile application associated with the financial services platform and request to provision a secondary user account (e.g., a sub-account corresponding to one or more authorized users) on the financial services platform.

In particular embodiments, in response to receiving the first request, the one or more computer servers may determine based on an input received from the first electronic device that the secondary user account is to be linked with a primary user account as a precondition for provisioning the secondary user account. For example, in particular embodiments, based on the date of birth, age, or other identity-based criteria suitable for input via the financial services mobile application, the one or more computer servers may determine that the secondary user account is a youth-intended account, and is thus to be interlinked with a primary user account as a precondition for provisioning. In particular embodiments, the one or more computer servers may then provide a second request to a second electronic device associated with a second user, in which the second request may correspond to a prompt to provision the primary user account. For example, in particular embodiments, the one or more computer servers may, in response to one or more inputs received from the first electronic device, generate and provide an alert (e.g., a short messaging service (SMS) message, a multimedia service (MMS) message, a push notification, an email, a social media posting, a P2P message, or other similar notification) to the second electronic device to prompt the second user to provision the primary user account (e.g., a primary platform account corresponding to an adult user or other sponsor user for the secondary user account).

In particular embodiments, the one or more computer servers may then receive, from a second instance of the application executing on the second electronic device associated with the second user, a confirmation to provision the primary user account with the financial services platform. For example, in particular embodiments, the second user (e.g., an "independent user", such as an adult user, a sponsor user, or other similar user over adult age) may launch an instance of the financial services mobile application on the second electronic device and request and confirm the provisioning of a primary user account (e.g., a primary platform account corresponding to an adult user or other sponsor user for the secondary user account) on the financial services platform.

In particular embodiments, in response to receiving the confirmation to provision the primary user account, the one or more computer servers may then proceed in provisioning the secondary user account and the primary user account, in which the secondary user account is linked to the primary user account. For example, in particular embodiments, once the second user (e.g., an independent user, such as an adult user, a sponsor user, or other similar user over adult age) requests and confirms the provisioning of a primary user account (e.g., a primary platform account corresponding to an adult user or other sponsor user for the secondary user account) and confirms that the primary user account (e.g., a primary platform account corresponding to an adult user or other sponsor user for the secondary user account) is to be interlinked with the secondary user account (e.g., a sub-account corresponding to one or more authorized users) (and thus satisfying the precondition for provisioning the secondary user account), the one or more computer servers may then proceed provisioning the primary user account (e.g., a primary platform account corresponding to an adult user or other sponsor user for the secondary user account) and the secondary user account (e.g., a sub-account corresponding to one or more authorized users) concurrently.

In particular embodiments, further in response to receiving the confirmation to provision the primary user account, the one or more computer servers may also generate a deposit account for the primary user account and one credit account for each of the primary user account and the interlinked secondary user account. In particular embodiments, by generating the deposit account for the primary user account and the credit account for each of the secondary user account and the primary user account without first opening a checking account or debit card, the present embodiments may bypass compliance and/or other administrative technical issues that may be associated with first opening a checking account or debit card. In accordance with the present the embodiments, bypassing the compliance and/or other administrative technical issues that may be associated with first opening a checking account or debit card may, in some embodiments, help to streamline the processing workload, database management, and network latency of the financial services platform by reducing the data size and complexity of the servers and database(s) utilized for hosting and servicing the primary platform account.

In particular embodiments, the deposit account, which is owned by the second user (e.g., adult user or other sponsor user over adult age), may be generated and utilized to hold funds as collateral to secure repayment of balances corresponding to the respective credit accounts. For example, in particular embodiments, the primary user account (e.g., a primary platform account corresponding to an adult user or other sponsor user for the secondary user account) may include, for example, the deposit account and a credit account (e.g., credit card spending account). Similarly, the secondary user account (e.g., a sub-account corresponding to one or more authorized users) may include, for example, a sub-account for the first user (e.g., an authorized user or youth user) or other authorized users and may include, for example, a designated instance representing a predetermined apportionment of any funds held in the deposit account and allocated for use by the secondary user account (e.g., a sub-account corresponding to one or more authorized users) by way of a credit account (e.g., credit card spending account) corresponding to the secondary user account.

For example, in particular embodiments, the deposit account may be generated and utilized to cause or otherwise influence the account owner and the authorized user(s) to potentially save more than spend, in that the deposit account serves as a user-controlled and user-configurable (e.g., the account owner controls the amount of funds that is deposited to the deposit account and the amount of funds that is allocated to primary platform account and to each of the interlinked secondary sub-accounts) computer-based creditor or guarantor for all transactions made utilizing the credit account (e.g., credit card spending account) for the primary user account (e.g., a primary platform account corresponding to an adult user or other sponsor user for the secondary user account) and the secondary user account (e.g., a sub-account corresponding to one or more authorized users).

For example, in particular embodiments, for each secondary user account (e.g., a sub-account corresponding to one or more authorized users) provisioned and interlinked with the primary user account (e.g., a primary platform account corresponding to an adult user or other sponsor user for the secondary user account), the account owner may allocate funds held by the deposit account to the apportionment for saving and spending by authorized users per secondary user account (e.g., a sub-account corresponding to one or more authorized users). In this way, each secondary user account (e.g., sub-account) may be provided its own spending limit, which may be calculated, for example, as the total amount of funds allocated to the apportionment corresponding to that specific secondary user account (e.g., an authorized user account) minus any outstanding balance on the credit account corresponding to that specific secondary user account (e.g., a sub-account corresponding to one or more authorized users). Additionally, the spending limit allocated to the apportionment corresponding to any secondary user account (e.g., a sub-account corresponding to one or more authorized users) may not exceed (either individually or collectively) the total amount of funds held by the deposit account.

In particular embodiments, by way of leveraging the deposit account of the primary platform account that operates to hold funds as collateral to secure repayment of balances corresponding to the respective credit accounts, the one or more computer servers may generate one or more data-driven credit scores or other credit history markers internal to the financial services platform for, for example, the first user (e.g., an authorized user or youth user) before reaching adult age. For example, in particular embodiments, the one or more computer servers may monitor and analyze financial data and transaction data associated with the secondary user account (e.g., a sub-account corresponding to one or more authorized users), for example, to determine user credit utilization (e.g., a difference between the spending limit allocated to the secondary user account and the amount the first user spends per cycle), length of time the secondary user account is in "good standing" with respect to managing the balance of the secondary user account (e.g., a sub-account corresponding to one or more authorized users) on the financial services platform, length of time since the secondary user account (e.g., a sub-account corresponding to one or more authorized users) has been provisioned, employment history and income of the first user (e.g., determined based on direct deposits received to the secondary user account over a time period), and so forth.

In particular embodiments, based on the financial data and transaction data associated with the secondary user account (e.g., a sub-account corresponding to one or more authorized users), the one or more computer servers may generate one or more credit scores for the first user, for example, that may be internal to the financial services platform for the time period for which the first user (e.g., an authorized user or youth user) is below adult age (e.g., under 18 years old) and/or other dependent user under conservatorship or guardianship and reportable to credit bureaus once the first user (e.g., an authorized user or youth user) turns adult age (e.g., 18 years or older). In one embodiment, upon the first user (e.g., an authorized user or youth user) turning adult age (e.g., 18 years or older) and based on the generated internal credit score of the first user (e.g., an authorized user or youth user) and/or other dependent user under conservatorship or guardianship, the one or more computer servers may automatically decouple (e.g., delinking the previously interlinked primary platform account and the sub-account(s) corresponding to the now adult aged authorized user), for example, the secondary user account (e.g., a sub-account corresponding to one or more authorized users) associated with the first user from the primary user account (e.g., a primary platform account corresponding to an adult user or other sponsor user for the secondary user account) associated with the second user and generate an offer to extend one or more unsecured lines of credit to the first user.

In particular embodiments, further in response to receiving the confirmation to provision the primary user account, the one or more computer servers may also generate one virtual spending card for each of the secondary user account and the primary user account. For example, in particular embodiments, the virtual spending cards may correspond to respective physical credit cards that may be utilized to execute transactions (e.g., PoS transactions). In particular embodiments, the virtual spending cards and corresponding physical credit cards may be virtually designed (e.g., providing identity data to be displayed on the card, choosing a color of the virtual spending cards and corresponding physical credit cards, signing the back of the virtual spending cards and corresponding physical credit cards by performing one or more touch gestures on the displays of the first electronic device and second electronic device, and so forth) by the first user (e.g., an authorized user or youth user) and/or other dependent under conservatorship or guardianship and the second user (e.g., adult user or sponsor user) utilizing the respective instances of the financial services mobile application executing on the first electronic device and the second electronic device.

In particular embodiments, the virtual spending cards and corresponding physical credit cards may include one or more security features that may be associated with the virtual spending cards and corresponding physical credit cards at the time of creation, or, in other embodiments, may be pushed to the virtual spending cards and corresponding physical credit cards as security updates after a time of which the virtual spending cards and corresponding physical credit cards have been created and utilized with respect to the primary user account (e.g., a primary platform account corresponding to an adult user or other sponsor user for the secondary user account) and the secondary user account (e.g., a sub-account corresponding to one or more authorized users). For example, in particular embodiments, the one or more computer servers may generate separate and distinct account numbers between each virtual spending card and its corresponding physical credit card for, for example, the same primary user account (e.g., a primary platform account corresponding to an adult user or other sponsor user for the secondary user account) or the same the secondary user account (e.g., a sub-account corresponding to one or more authorized users). The virtual spending card and its corresponding physical credit card for the primary user account (e.g., a primary platform account corresponding to an adult user or other sponsor user for the secondary user account) may also be separate and distinct from the secondary user account (e.g., a sub-account corresponding to one or more authorized users).

Additionally, in particular embodiments, the one or more computer servers may generate separate and distinct account numbers between each virtual spending card and the corresponding mobile wallet version of the credit card that may be stored on the first electronic device or the second electronic device. In particular embodiments, by generating separate and distinct account numbers as discussed herein, the financial services platform may guard against fraud, theft, or lost or stolen virtual cards or physical cards, in that the one or more computer servers may disable one version of the cards corresponding to the credit account (e.g., credit card spending account) upon detection of an aberrant activity while allowing the first user or the second user to continue spending by utilizing the other version corresponding to the credit account (e.g., credit card spending account). For example, in one embodiment, the physical spending card may include a disabled magnetic strip or microchip while the virtual spending card may remain enabled and operable (e.g., as a security feature) until the user confirms the aberrant activity on the physical spending card.

In particular embodiments, the one or more computer servers may receive from the second instance of the application, a third request to deposit an amount of funds to the deposit account and to allocate specified portions of the amount of funds to each of the credit accounts. For example, in particular embodiments, after the primary user account (e.g., a primary platform account corresponding to an adult user or other sponsor user for the secondary user account) and the secondary user account (e.g., a sub-account corresponding to one or more authorized users) is provisioned and the deposit account credit accounts are generated, the second user (e.g., adult user or sponsor user) may deposit an amount of funds to deposit account and allocate the respective spending limits for the primary user account (e.g., a primary platform account corresponding to an adult user or other sponsor user for the secondary user account) and the secondary user account (e.g., a sub-account corresponding to one or more authorized users). In particular embodiments, the one or more computer servers may then update the deposit account in accordance with a value of the amount of funds deposited by the second user and update each of the credit accounts in accordance with a value of the specified portions of the amount of funds.

Indeed, the present techniques of providing a financial services platform for provisioning a primary platform account and interlinked secondary sub-account(s), which are each associated with individual credit card spending accounts for servicing and executing transactions with respect to the provisioned primary platform account and linked secondary sub-account(s), may provide technical improvements to previous or existing finance-related cloud-computing based platforms. For example, in accordance with the presently disclosed techniques, the financial services platform may provide technical improvements to previous or existing finance-related cloud-computing based platforms by streamlining the processing workload and database management that may be associated with such computing platforms.

For example, by providing a singular deposit account of the primary platform account by which funds are held as collateral to secure repayment of balances corresponding to credit accounts of secondary sub-account(s) interlinked with the primary platform account (e.g., as opposed to having a large number of individual primary platform accounts), excessive calls or queries to the database(s) to which the primary platform account may be stored and maintained may be reduced. By extension, the reduced calls or queries to the database(s) to which the primary user accounts may be stored and maintained may further result in reducing the processing workloads for the one or more computer servers associated with the financial services platform on which the primary platform account may be hosted and serviced.

For example, in one embodiment, the provisioned primary platform account may be implemented as one or more storage classes within the database(s) and the provisioned linked secondary sub-account(s) may be implemented as one or more object instances of the storage class representing the provisioned primary platform account. In one embodiment, such an implementation, for example, may improve database management and reduce processing workload and network latency that may be potentially associated the financial services platform. In particular embodiments, the present techniques may further improve cybersecurity associated with electronic transactions (e.g., PoS transactions, payment transfers, recurring bill payments, and so forth) and virtual spending cards by generating separate and distinct randomized account numbers between a virtual spending card and its corresponding physical credit card, as well as between the virtual spending card and its corresponding mobile wallet representation across all interlinked accounts.

FIG. 1 illustrates a financial services platform and network environment 100 that may be utilized for provisioning a primary platform account and interlinked secondary sub-account(s), which are each associated with individual credit card spending accounts for servicing and executing transactions with respect to the provisioned primary platform account and linked secondary sub-account(s), in accordance with the presently disclosed embodiments. As depicted, in particular embodiments, the financial services platform and network environment 100 may include a number of users 102A (e.g., "Primary User"), 102B (e.g., "Authorized User 1"), 102C (e.g., "Authorized User 2"), and 102D (e.g., "Authorized User N") that may be associated with respective mobile electronic devices 104A, 104B, 104C, and 104D. In particular embodiments, the respective mobile electronic devices 104A, 104B, 104C, and 104D may be utilized for executing respective instances of financial services applications 106A, 106B, 106C, and 106D (e.g., which may be each associated with and serviced by a financial services platform 112 via one or more networks 110).

In particular embodiments, as further depicted by FIG. 1, each of the respective instances of financial services applications 106A, 106B, 106C, and 106D executing on the respective mobile electronic devices 104A, 104B, 104C, and 104D may be associated with virtual spending cards 108A, 108B, 108C, and 108D. In particular embodiments, the virtual spending cards 108A, 108B, 108C, and 108D may be utilized to execute point-of-sale (PoS) transactions or other transactions with one or more merchants 114. For example, in particular embodiments, the respective mobile electronic devices 104A, 104B, 104C, and 104D may exchange electronic data associated with the virtual spending cards 108A, 108B, 108C, and 108D over the one or more networks 110 with a payment processor of a merchant-acquirer 116 associated with the one or more merchants 114. For example, in particular embodiments, the merchant-acquirer 116 may be suitable for settling credit card transactions between the one or more merchants 114 and the number of users 102A (e.g., "Primary User"), 102B (e.g., "Authorized User 1"), 102C (e.g., "Authorized User 2"), and 102D (e.g., "Authorized User N").

In particular embodiments, as further depicted by FIG. 1, the respective mobile electronic devices 104A, 104B, 104C, and 104D may be coupled via the one or more networks 110 to the financial services platform 112. In particular embodiments, the financial services platform 112 may include, for example, a cloud-based computing architecture suitable for hosting and servicing the respective instances of financial services applications 106A, 106B, 106C, and 106D executing on the respective mobile electronic devices 104A, 104B, 104C, and 104D. For example, in one embodiment, the financial services platform 112 may include a Platform as a Service (PaaS) architecture, a Software as a Service (SaaS) architecture, a Compute as a Service (CaaS) architecture, an Infrastructure as a Service (IaaS) architecture, a Data as a Service (DaaS) architecture, or other similar cloud-based computing architecture (e.g., "X" as a Service (XaaS)).

In particular embodiments, as further depicted by FIG. 2, the financial services platform 112 may include one or more computer server(s) 118 and one or more data stores(s) 120. For example, in some embodiments, the computer server(s) 118 may include one or more general purpose processors, one or more graphic processing units (GPUs), one or more application-specific integrated circuits (ASICs), one or more system-on-chips (SoCs), one or more microcontrollers, one or more field-programmable gate arrays (FPGAs), or any other processing device(s) that may be suitable for providing processing and/or computing support for the respective instances of financial services applications 106A, 106B, 106C, and 106D executing on the respective mobile electronic devices 104A, 104B, 104C, and 104D. Similarly, the data stores(s) 120 may include, for example, one or more internal databases that may be utilized to store information (e.g., user profile data, user account data, user transaction data, user financial data, and so forth) associated with the number of users 102A (e.g., "Primary User"), 102B (e.g., "Authorized User 1"), 102C (e.g., "Authorized User 2"), and 102D (e.g., "Authorized User N").

In particular embodiments, as further depicted by FIG. 1, the one or more computer server(s) 118 may generate a platform account 122 that may be stored to the one or more data stores(s) 120. In particular embodiments, the platform account 122, which may be owned, for example, by an adult user (e.g., user 102A ("Primary User")), may include a deposit account 124 and a credit spending account 126. As will be further appreciated below, in particular embodiments, the deposit account 124 may be generated and utilized to hold funds as collateral to secure repayment of balances corresponding to the credit spending account 126 or other sub-accounts that may be interlinked to the platform account 122. In particular embodiments, the platform account 122 may also be linked to one or more third-party accounts and services 128 (e.g. a third-party banking account, an automated clearing house (ACH) service, a direct deposit service, and so forth), which may be utilized to provide or receive deposits or P2P payments to the deposit account 124.

Figure 2A:
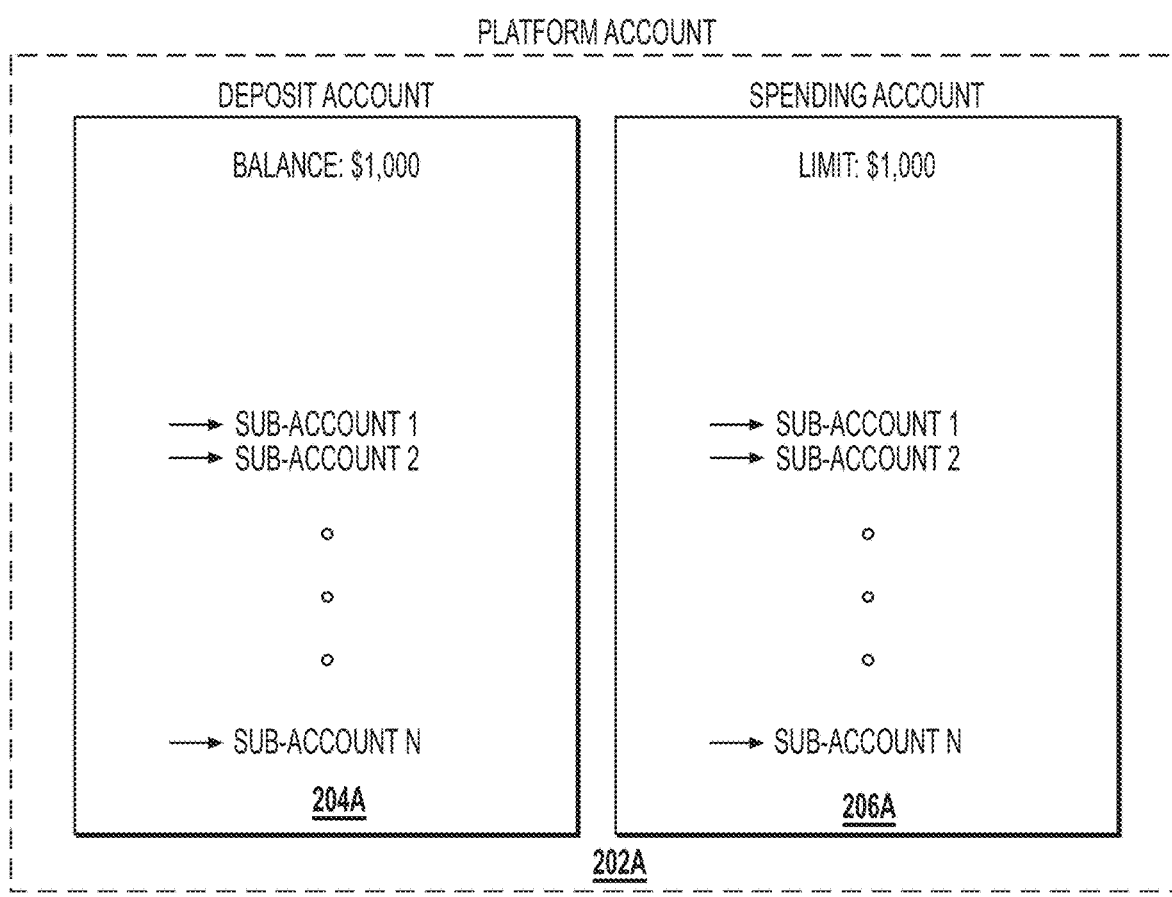
FIG. 2A illustrates an example diagram of a platform account, including a deposit account with pooled deposited funds and a spending account with pooled spending card limits.

FIGS. 2A-2D illustrates one or more example diagrams of a platform account (e.g., platform account 122 as discussed above with respect to FIG. 1) and interlinked sub-accounts, in accordance with the presently disclosed embodiments. For example, FIG. 2A illustrates an example diagram 200A of a platform account 202A, which may include, for example, a deposit account 204A with pooled deposited funds and a credit spending account 206A with pooled spending card limits. For example, as depicted, the deposit account 204A may include, for example, a balance of $1,000 that may be held in the deposit account 202A as collateral to secure repayment of balances corresponding to the credit spending account 206A. For example, the owner of the platform account 202A, as well as a number of interlinked sub-accounts (e.g., "Sub-Account 1", "Sub-Account 2", and "Sub-Account N") may make transactions on the credit spending account 206A until collectively reaching the predetermined $1,000 spending limit.

Figure 2B:
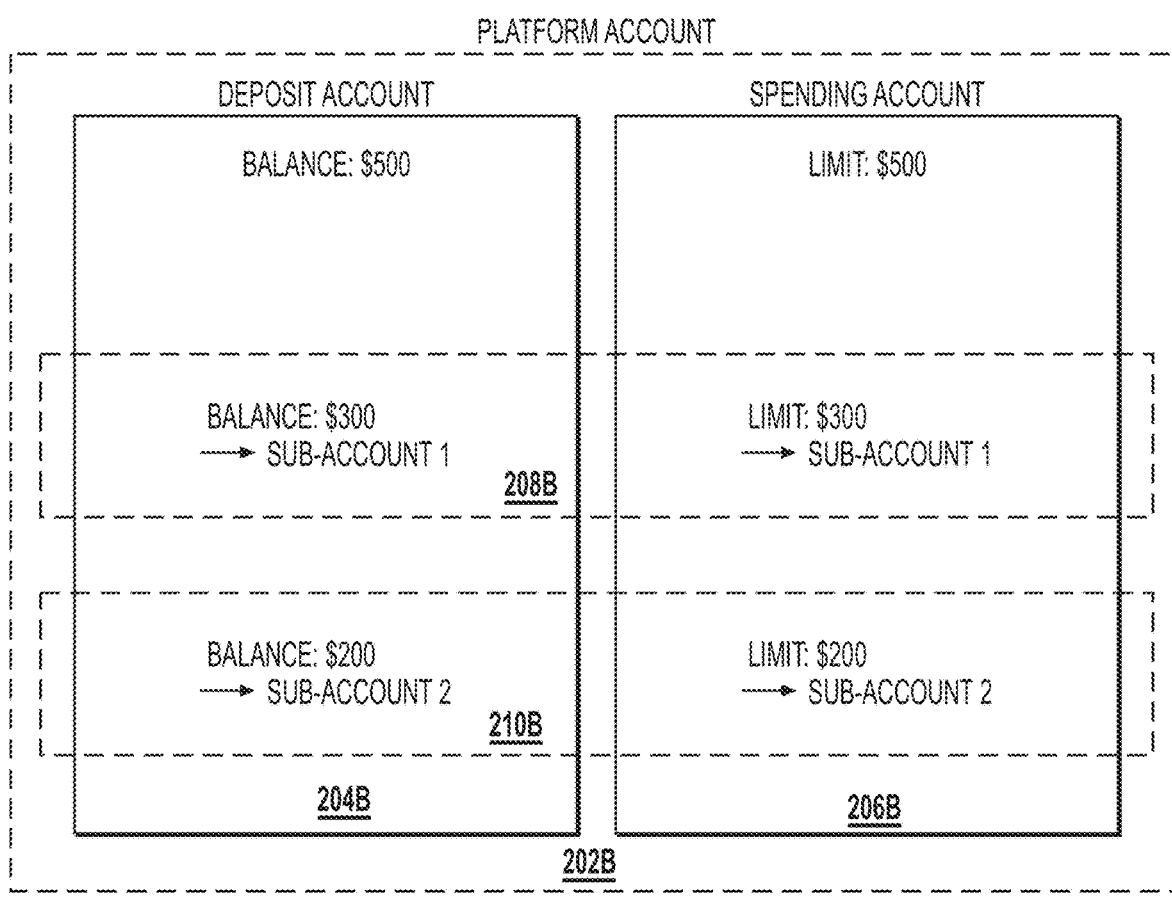
FIG. 2B illustrates an example diagram of a platform account, including a deposit account with specific allocations of deposited funds to each sub-account and a spending account with specific spending card limits corresponding to the specific allocations of deposited funds.

Similarly, FIG. 2B illustrates an example diagram 200B of a platform account 202B, including a deposit account 204B with specific allocations of deposited funds to each sub-account 208B, 210B and a credit spending account 206B with specific spending card limits corresponding to the specific allocations of deposited funds. For example, as depicted, the deposit account 204B may include, for example, an allocated balance of $500 for the platform account 202B that may be held in the deposit account 202B as collateral to secure repayment of balances corresponding to the credit spending account corresponding to the platform account 202B. In particular embodiments, the deposit account 204B may also include, for example, an allocated balance of $300 for the sub-account 208B that may be held in the deposit account 202B as collateral to secure repayment of balances corresponding to the credit spending account of the sub-account 208B. Lastly, the deposit account 204B may also include, for example, an allocated balance of $200 for the sub-account 210B that may be held in the deposit account 202B as collateral to secure repayment of balances corresponding to the credit spending account of the sub-account 210B.

In particular embodiments, the owner of the platform account 202B (e.g., user 102A ("Primary User")) may be the solely designated party responsible for determining and inputting the respective allocations and spending limits. In other embodiments, the one or more computer server(s) of the financial services platform 112 may determine and generate respective allocations and spending limits for the platform account 202B, the sub-account 208B, and the sub-account 210B based on, for example, historical financial data and transaction data (e.g., respective spending habits analyzed over a spending cycle, monthly income, number of P2P transfers executed or requested over a spending cycle, and so forth) associated with the platform account 202B, the sub-account 208B, and the sub-account 210B, respectively. In one embodiment, subsequent to the respective allocations and spending limits for the platform account 202B, the sub-account 208B, and the sub-account 210B being determined generated by the financial services platform 112, the one or more computer server(s) 118 may generate and provide a notification by way of the financial services mobile application 106A executing on the electronic device 104A for the respective allocations and spending limits to be accepted or rejected, for example, by the owner of the platform account 202B (e.g., user 102A ("Primary User")).

FIG. 2C illustrates an example diagram of a platform ledger 200C over a one-month spending-reconciliation cycle, based on pooled deposited funds and pooled spending card limits. As depicted, on March $4^{th}$, a deposit of $1,000 may be made to the deposit account and the balance on the credit spending account may be $0 with a spending limit of $1,000. On March $10^{th}$, a transaction of $200 may be made on the spending account by the platform account, thus rendering the pooled balance on the credit spending account to $250 with the pooled spending limit decreased to $750. On March $20^{th}$, a transaction of $50 may be made on the spending account by the sub-account 2, thus rendering the pooled balance on the credit spending account to $300 with the pooled spending limit decreased to $700. On March $25^{th}$, a transaction of $300 may be made on the spending account by the platform account, thus rendering the pooled balance on the credit spending account to $600 with the pooled spending limit decreased to $400.

Lastly, on March $30^{th}$, a transaction of $150 may be made on the spending account by the sub-account 2, thus rendering the pooled balance on the credit spending account to $750 with the pooled spending limit decreased to $250. On March $31^{st}$ (e.g., end of the one-month spending-reconciliation cycle), the platform ledger 200C may be reconciled by applying the $1,000 deposit to the final pooled balance on the credit spending account of $750 and leaving a pooled spending limit $250. On April $1^{st}$, a deposit of $500 may be made to the deposit account and the balance on the credit spending account may be $0 with a spending limit of $750 (e.g., $250 previous spending limit+$500 April $1^{st}$ deposit).

FIG. 2D illustrates an example diagram of a platform ledger 200D over a spending-reconciliation cycle, based on specific allocations of deposited funds to each sub-account and corresponding spending card limits. For example, on March $4^{th}$, a deposit of $1,000 may be made to the deposit account, including $500 allocated to the platform account, $250 allocated to the sub-account 1, and $250 allocated to the sub-account 2. On March $5^{th}$, a transaction of $250 may be made on the spending account by the platform account. The resulting balances (spending card limits) for the allocations of platform account, sub-account 1, and sub-account 2, respectively, may be $250 ($250), $0 ($250), and $0 ($250). On March $7^{th}$, a transaction of $50 may be made on the spending account by the sub-account 1. The resulting balances (spending card limits) for the allocations of platform account, sub-account 1, and sub-account 2, respectively, may be $250 ($250), $50 ($200), and $0 ($250). On March $10^{th}$, a transaction of $200 may be made on the spending account by the platform account. The resulting balances (spending card limits) for the allocations of platform account, sub-account 1, and sub-account 2, respectively, may be $450 ($50), $50 ($200), and $0 ($250).

On March $20^{th}$, a transaction of $25 may be made on the spending account by the platform account. The resulting balances (spending card limits) for the allocations of platform account, sub-account 1, and sub-account 2, respectively, may be $475 ($25), $50 ($200), and $0 ($250). On March $25^{th}$, a transaction of $200 may be made on the spending account by the sub-account 1. The resulting balances (spending card limits) for the allocations of platform account, sub-account 1, and sub-account 2, respectively, may be $475 ($25), $250 ($0), and $0 ($250). On March $30^{th}$, a transaction of $20 may be made on the spending account by the platform account and a transaction of $50 may be made on the spending account by the sub-account 2. The resulting balances (spending card limits) for the allocations of platform account, sub-account 1, and sub-account 2, respectively, may be $495 ($5), $250 ($0), and $50 ($20).

On March $31^{st}$ (e.g., end of the one-month spending-reconciliation cycle), the platform ledger 200D may be reconciled by applying the respective allocations of the $1,000 deposit (e.g., $500 for the platform account, $250 for the sub-account 1, and $250 for sub-account) to the final balance on the respective credit spending accounts totaling $795 and the resulting balances (spending card limits) for the allocations of platform account, sub-account 1, and sub-account 2, respectively, may be $0 ($5), $0 ($0), and $0 ($200). On April $1^{st}$, another deposit of $1,000 may be made to the deposit account, including $500 allocated to the platform account, $250 allocated to the sub-account 1 and $250 allocated to the sub-account 2. The resulting balances (spending card limits) for the allocations of platform account, sub-account 1, and sub-account 2, respectively, may be $0 ($505), $0 ($250), and $0 ($450).

In particular embodiments, by way of leveraging the deposit account 124 of the platform account 122 that operates to hold funds as collateral to secure repayment of balances corresponding to the respective credit accounts, the one or more computer server(s) 118 may generate one or more data-driven credit scores and/or credit history markers internal to the financial services platform 112 for, for example, the authorized user 102A (e.g., "Authorized User 1") or other youth user before reaching adult age. For example, in particular embodiments, the one or more computer server(s) 118 may monitor and analyze financial data and transaction data (e.g., utilizing one or more machine-learning (ML) models trained for analyzing data patterns from large amounts of financial data and transaction data that may be stored to the data store(s) 120) associated with the sub-account corresponding to the authorized user 102A (e.g., "Authorized User 1"), for example, to determine user credit utilization (e.g., a difference between the spending limit allocated to the sub-account and the amount the authorized user spends per spending cycle), length of time the secondary user account is in "good standing" with respect to managing the balance of the sub-account corresponding to the authorized user 102A (e.g., "Authorized User 1") on the financial services platform 112 (e.g., on-time payments of the balances on the sub-account over a number of spending cycles, sub-account not being default, and so forth), length of time since the sub-account corresponding to authorized user 102A (e.g., "Authorized User 1") has been provisioned, employment history and income of the authorized user 102A (e.g., "Authorized User 1") (e.g., determined based on direct deposits received to the sub-account over a time period), and so forth.

In particular embodiments, based on the financial data and transaction data associated with the sub-account corresponding to authorized user 102A (e.g., "Authorized User 1"), the one or more computer server(s) 118 may generate one or more credit scores and/or credit history markers for the authorized user 102A (e.g., "Authorized User 1"), for example, that may be internal to the financial services platform 112 for the time period for which the authorized user 102A (e.g., "Authorized User 1") is below adult age and reportable to credit bureaus once the authorized user 102A (e.g., "Authorized User 1") turns adult age (e.g., 18 years or older). In one embodiment, upon the authorized user 102A (e.g., "Authorized User 1") turning adult age (e.g., 18 years or older) and based on the generated internal credit score and/or credit history marker of the authorized user 102A (e.g., "Authorized User 1"), the one or more computer server(s) 118 may automatically decouple (e.g., delinking the previously interlinked platform account 122 and the sub-account(s) corresponding to the now adult aged authorized user 102A (e.g., "Authorized User 1")), the sub-account corresponding to the authorized user 102A (e.g., "Authorized User 1") from the platform account 122. In particular embodiments, once the sub-account corresponding to the authorized user 102A (e.g., "Authorized User 1") is delinked from the platform account 122, the sub-account may be automatically converted to a platform account, including a primary deposit account (e.g., similar to deposit account 124) and primary credit account (e.g., similar to spending account 126) to be managed solely by the authorized user 102A (e.g., "Authorized User 1").

In another embodiment, upon the authorized user 102A (e.g., "Authorized User 1") or other youth user turning adult age (e.g., 18 years or older) and based on the generated internal credit score and/or credit history marker of the first user (e.g., an authorized user or youth user), the one or more computer server(s) 118 may generate and provide an offer to extend one or more unsecured lines of credit to the authorized user 102A (e.g., "Authorized User 1"). For example, in particular embodiments, upon the authorized user 102A (e.g., "Authorized User 1") turning adult age (e.g., 18 years or older) and based on the generated internal credit score and/or credit history marker of the authorized user 102A (e.g., "Authorized User 1"), the one or more computer server(s) 118 may, for example, generate an offer to extend one or more prequalified auto loans for the authorized user 102A (e.g., "Authorized User 1"), one or more educational loans for the authorized user 102A (e.g., "Authorized User 1"), one or more small-business loans or lines of credit for the authorized user 102A (e.g., "Authorized User 1"), and so forth. In particular embodiments, once the authorized user 102A (e.g., "Authorized User 1") accepts an offer for an unsecured line of credit, the one or more computer server(s) 118 may generate a credit account (e.g., separate from the credit card spending account) on the financial services platform 112 and associated with the platform account of the authorized user 102A (e.g., "Authorized User 1") for management and repayment by the authorized user 102A (e.g., "Authorized User 1").

As a running example of the forgoing, referring back to FIG. 2D previously discussed above, sub-account 1 spent up to its spending limit (e.g., $250) by March $25^{th}$. In accordance with the presently disclosed embodiments, the financial services platform 112 may calculate a credit utilization of 100% (e.g., "maxed out") for sub-account 1 over the March spending-reconciliation cycle. In some embodiments, a credit utilization above, for example, 30% may adversely impact the internal credit score and/or credit history marker corresponding to sub-account 1. However, because the full balance of sub-account 1 is paid in full by the March $31^{st}$ end of the one-month spending-reconciliation cycle, this full payment may positively impact the internal credit score and/or credit history marker corresponding to sub-account 1.

On the other hand, sub-account 2 spent only $50 of its spending limit (e.g., $250) by the March $30^{th}$ end of the spending-reconciliation cycle. In accordance with the presently disclosed embodiments, the financial services platform 112 may calculate a credit utilization of 25% for sub-account 2 over the March spending-reconciliation cycle. Thus, because the credit utilization for sub-account 2 is less than 30%, for example, the internal credit score and/or credit history marker may be positively impacted. Further, because the full balance of sub-account 2 is paid in full by the March $31^{st}$ end of the one-month spending-reconciliation cycle, this full payment may further positively impact the internal credit score and/or credit history marker corresponding to sub-account 2. In some embodiments, these credit history data for sub-account 1 and sub-account 2 may be recorded and tallied over the time these sub-accounts are active, and these may be utilized by the financial services platform 112 to generate a credit report for the users corresponding to sub-account 1 and sub-account 2 once the users turn adult age (e.g., 18 years or older) for reporting to one or more credit bureaus for establishing a meaningful credit history for the users corresponding to sub-account 1 and sub-account 2. In one embodiment, the financial services platform 112 to generate a credit report based on, for example, the 24 spending-reconciliation cycles preceding the $18^{th}$ birthday of the users corresponding to sub-account 1 and sub-account 2. In another embodiment, the financial services platform 112 to generate a credit report based on, for example, all of the spending-reconciliation cycles preceding the $18^{th}$ birthdays of the users corresponding to sub-account 1 and sub-account 2.

Figure 3A:
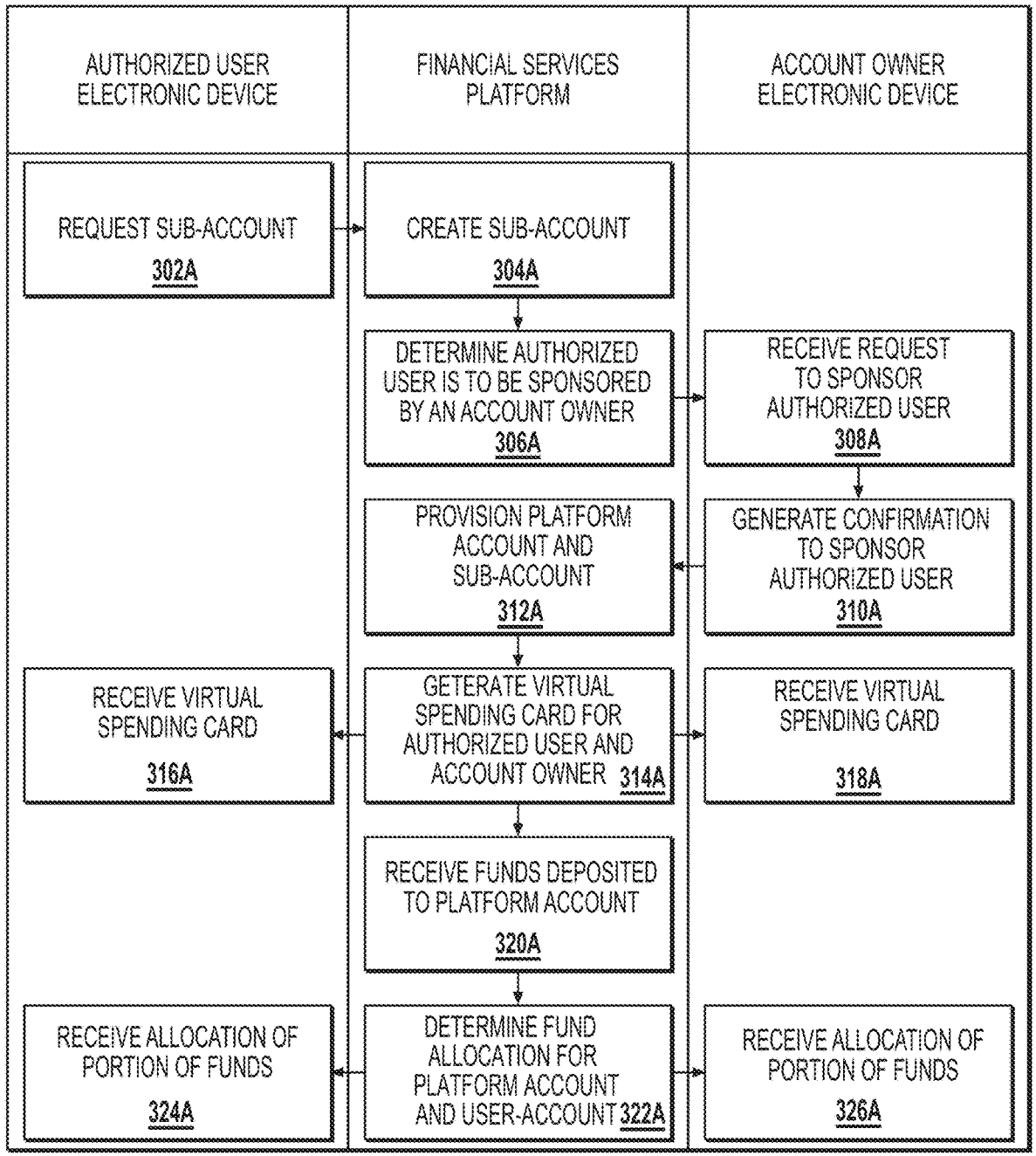
FIG. 3A illustrates a workflow diagram for provisioning a platform account and linked sub-account and servicing transactions utilizing the provisioned platform account and linked sub-account.

FIG. 3A illustrates a workflow diagram 300A for provisioning a primary platform account and interlinked secondary sub-account(s), which are each associated with individual credit card spending accounts for servicing and executing transactions with respect to the provisioned primary platform account and linked secondary sub-account(s), in accordance with the presently disclosed embodiments. The workflow diagram 300A may be performed utilizing one or more processing devices (e.g., electronic devices 104A, 104B or financial services platform 112) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing financial data and transaction data), software (e.g., instructions running/executing on one or more processors), firmware (e.g., microcode), or some combination thereof.

The workflow diagram 300A may begin at a block 302A with one or more processing devices (e.g., electronic device 104A) requesting sub-account. The workflow diagram 300A may then continue at a block 304A with one or more processing devices (e.g., financial services platform 112) creating the sub-account. The workflow diagram 300A may then continue at a block 306A with one or more processing devices (e.g., financial services platform 112) determining that an authorized user is to be sponsored by an account owner. The workflow diagram 300A may then continue at a block 308A with one or more processing devices (e.g., electronic device 104B) receiving a request to sponsor the authorized user. The workflow diagram 300A may then continue at a block 310A with one or more processing devices (e.g., electronic device 104B) generating a confirmation to sponsor the authorized user. The workflow diagram 300A may then continue at a block 312A with one or more processing devices (e.g., financial services platform 112) provisioning a primary platform account and the sub-account interlinked with the platform account. The workflow diagram 300A may then continue at a block 314A with one or more processing devices (e.g., financial services platform 112) generating virtual spending cards for the authorized user and the account owner.

The workflow diagram 300A may then continue at a block 316A with one or more processing devices (e.g., electronic device 104A) receiving the first virtual spending card and at a block 318A with one or more processing devices (e.g., electronic device 104B) receiving the second virtual spending card. The workflow diagram 300A may then continue at a block 320A with one or more processing devices (e.g., financial services platform 112) receiving funds deposited by the account owner to the platform account. The workflow diagram 300A may then continue at a block 322A with one or more processing devices (e.g., financial services platform 112) determining fund allocations for the platform account and the sub-account based on the funds deposited by the account owner to the platform account. The workflow diagram 300A may then continue at a block 324A with one or more processing devices (e.g., electronic device 104A) receiving an allocation of a first portion of funds and at a block 326A with one or more processing devices (e.g., electronic device 104B) receiving an allocation of a second portion of funds.

FIG. 3B illustrates a flow diagram of a method for provisioning a platform account, which is associated with a deposit account and credit spending account for servicing and executing transactions, in accordance with the presently disclosed embodiments. The method 400 may be performed utilizing one or more processing devices (e.g., electronic devices 104A, 104B or financial services platform 112) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user data, financial data, market data, transaction data, and so forth), software (e.g., instructions running/executing on one or more processors), firmware (e.g., microcode), or some combination thereof.

The method 300B may begin block 302B with the one or more processing devices (e.g., electronic devices 104A, 104B or financial services platform 112) provisioning a platform ledger on the financial services platform, the platform ledger including a set of entries representing a platform account owned by a primary user and including a deposit account and a credit account. In certain embodiments, the primary user may be assigned a first spending card with a first spending limit, and an authorized user of the credit account may be assigned a second spending card with a second spending limit. In certain embodiments, the deposit account may be configured to hold funds as collateral to secure repayment of balances corresponding to the primary credit account and the secondary credit account. The method 300B may then continue at block 304B with the one or more processing devices (e.g., electronic devices 104A, 104B or financial services platform 112) receiving a request for an amount of funds to satisfy a transaction initiated with respect to the second spending card. The method 300B may then continue at block 306B with the one or more processing devices (e.g., electronic devices 104A, 104B or financial services platform 112) determining whether the request for the amount of funds can be satisfied by at least a portion of the funds held in the deposit account.

On the one hand, in response to determining (decision 308B) that the request for the amount of funds can be satisfied by at least the portion of the funds held in the deposit account, the method 300B may then continue at block 310B with the one or more processing devices (e.g., electronic devices 104A, 104B or financial services platform 112) updating entries of the platform ledger associated with the platform account to reflect an increase in the balance of the second spending card in accordance with a value of the amount of funds to satisfy the request for the amount of funds and concluding at block 312B with updating entries of the platform ledger associated with the platform account to reflect a decrease in the second spending limit based on the value of the amount of funds and the funds held in the deposit account. On the other hand, in response to determining (decision 308B) that the request for the amount of funds cannot be satisfied by at least the portion of the funds held in the deposit account, the method 300B may then return to block 304B with the one or more processing devices (e.g., electronic devices 104A, 104B or financial services platform 112) again receiving a request for an amount of funds to satisfy a transaction initiated with respect to the second spending card.

FIG. 3C illustrates a flow diagram of a method 300C for provisioning a secondary user account for financial capabilities through sponsorship by a primary user account with the financial services platform, in accordance with the presently disclosed embodiments. The method 400 may be performed utilizing one or more processing devices (e.g., electronic devices 104A, 104B or financial services platform 112) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user data, financial data, market data, transaction data, and so forth), software (e.g., instructions running/executing on one or more processors), firmware (e.g., microcode), or some combination thereof.

The method 300C may begin block 300C with the one or more processing devices (e.g., electronic devices 104A, 104B or financial services platform 112) receiving, from an instance of an application executing on an electronic device associated with a user, a request to provision a secondary user account for financial capabilities through sponsorship by a primary user account with the financial services platform. In certain embodiments, the application is associated with the financial services platform, and the secondary user account can only be provisioned upon creation of the primary user's account. On the one hand, in response to receiving a confirmation to provision the secondary user account (decision 304C), the method 300C may then continue at block 306C with the one or more processing devices (e.g., electronic devices 104A, 104B or financial services platform 112) provisioning for financial capabilities the primary user account and then the secondary user account, in which the secondary user account is linked to the primary user account. The method 300C may then continue at block 308B with the one or more processing devices (e.g., electronic devices 104A, 104B or financial services platform 112) generating a credit account for the primary user account and then for the secondary user account.

The method 300C may then continue at block 310C with the one or more processing devices (e.g., electronic devices 104A, 104B or financial services platform 112) generating a deposit account for the primary user account, in which the primary user owns the deposit account and the deposit account is configured to hold funds as collateral to secure repayment of balances corresponding to the credit accounts. The method 300C may then continue at block 312C with the one or more processing devices (e.g., electronic devices 104A, 104B or financial services platform 112) generating one virtual spending card for each of the credit account for the secondary user account and the credit account for the primary user account, the virtual spending cards configured to service transactions with respect to the primary user account and the secondary user account. On the other hand, in response to not receiving a confirmation to provision the secondary user account (decision 304C), the method 300C may return to block 302C with the one or more processing devices (e.g., electronic devices 104A, 104B or financial services platform 112) receiving, from an instance of an application executing on an electronic device associated with a user, a request to provision a secondary user account for financial capabilities through sponsorship by a primary user account with the financial services platform.

Figure 3D:
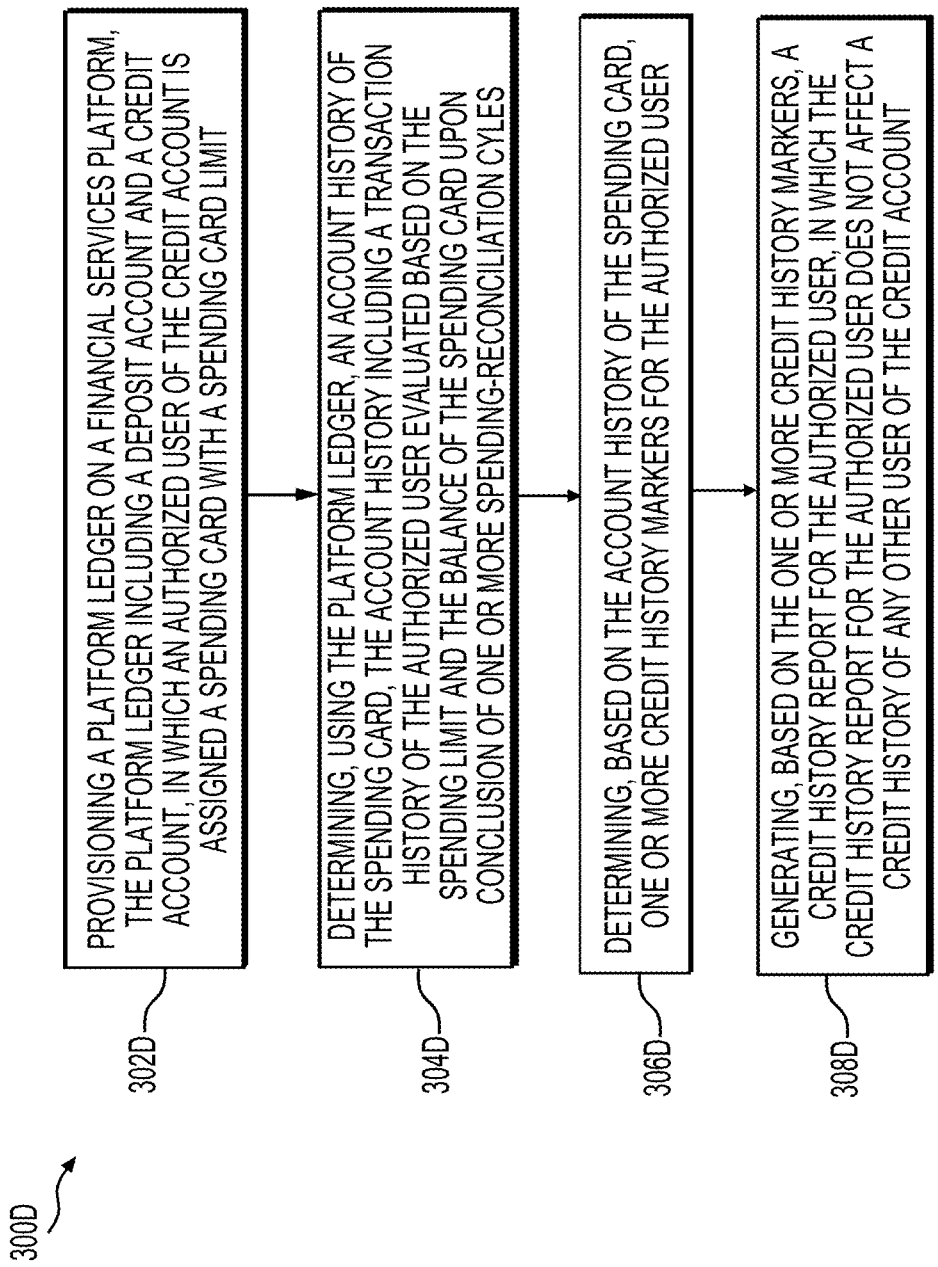
FIG. 3D illustrates a flow diagram of a method for determining one or more credit markers for a dependent user and generating a credit report for the dependent user.

FIG. 3D illustrates a flow diagram of a method 300D for determining one or more credit markers for a dependent user and generating a credit report for the dependent user, in accordance with the presently disclosed embodiments. The method 300D may be performed utilizing one or more processing devices (e.g., electronic devices 104A, 104B or financial services platform 112) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user data, financial data, market data, transaction data, and so forth), software (e.g., instructions running/executing on one or more processors), firmware (e.g., microcode), or some combination thereof.

The method 300D may begin block 302D with the one or more processing devices (e.g., electronic devices 104A, 104B or financial services platform 112) provisioning a platform ledger on the financial services platform, the platform ledger including a set of entries representing a platform account and including a deposit account and a credit account. In certain embodiments, an authorized user of the credit account may be assigned a spending card with a spending limit. In certain embodiments, the deposit account may hold funds as collateral to secure repayment of a balance corresponding to the spending card. The method 300D may then continue at block 304B with the one or more processing devices (e.g., electronic devices 104A, 104B or financial services platform 112) determining using the platform ledger, an account history of the spending card, in which the account history includes transaction activity of the authorized user evaluated based on: the spending limit and the balance of the spending card upon conclusion of one or more spending-reconciliation cycles. In certain embodiments, the spending limit varies based at least in part on funds held in the deposit account. The method 300D may then continue at block 306B with the one or more processing devices (e.g., electronic devices 104A, 104B or financial services platform 112) determining, based on the account history of the spending card, one or more credit history markers for the authorized user. The method 300D may then conclude at block 308B with the one or more processing devices (e.g., electronic devices 104A, 104B or financial services platform 112) generating, based on the one or more credit history markers, a credit history report for the authorized user, in which the credit history report for the authorized user does not affect credit history for any other user of the credit account.

Figure 3E:
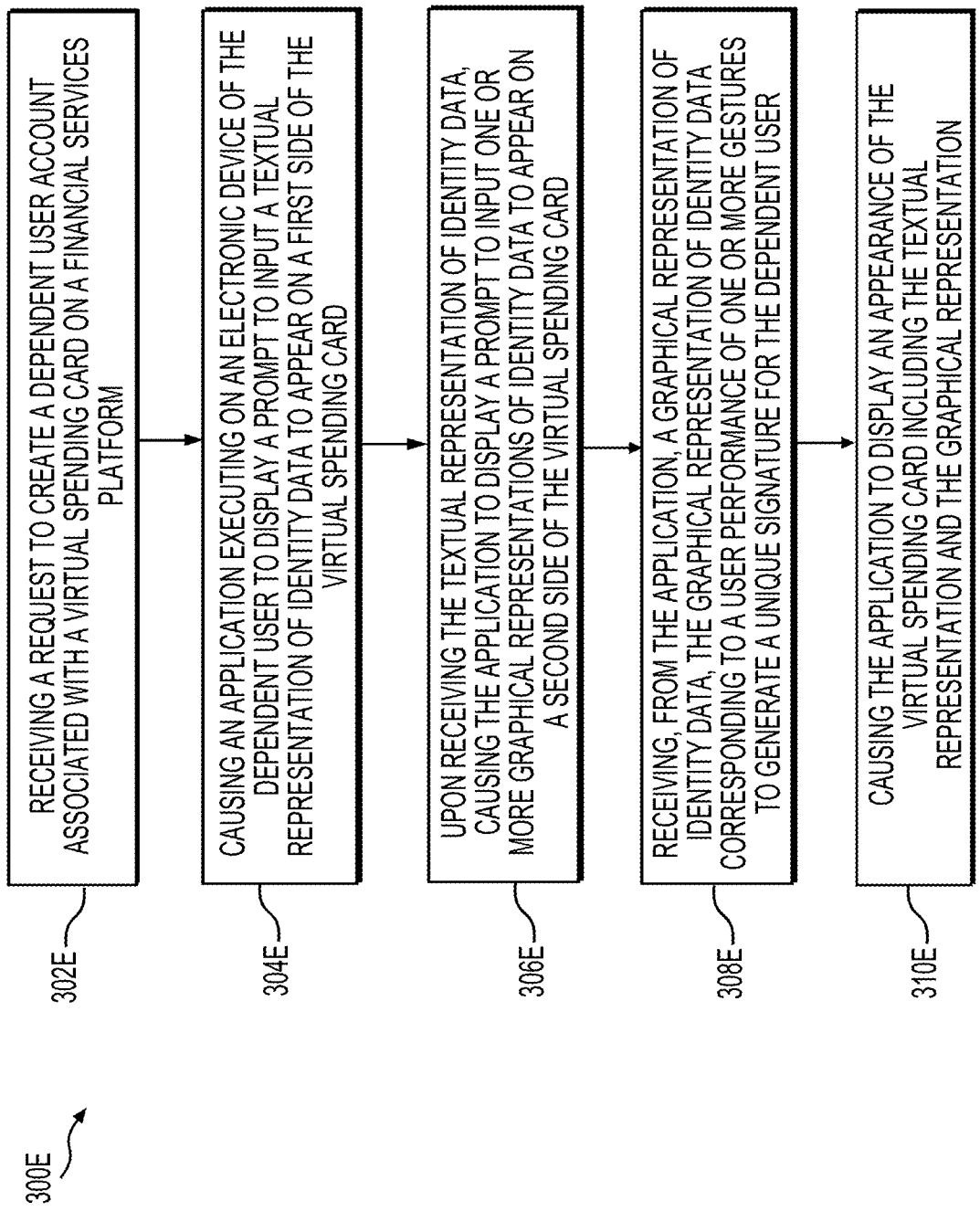
FIG. 3E illustrates a flow diagram of a method for designing and assigning one or more virtual cards for a dependent user.
Figure 4C:
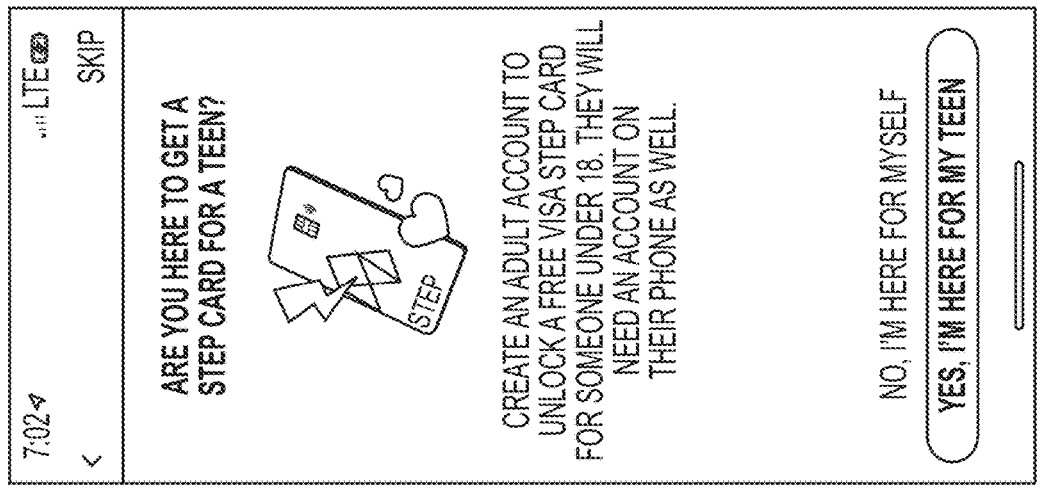
Figure 4B:
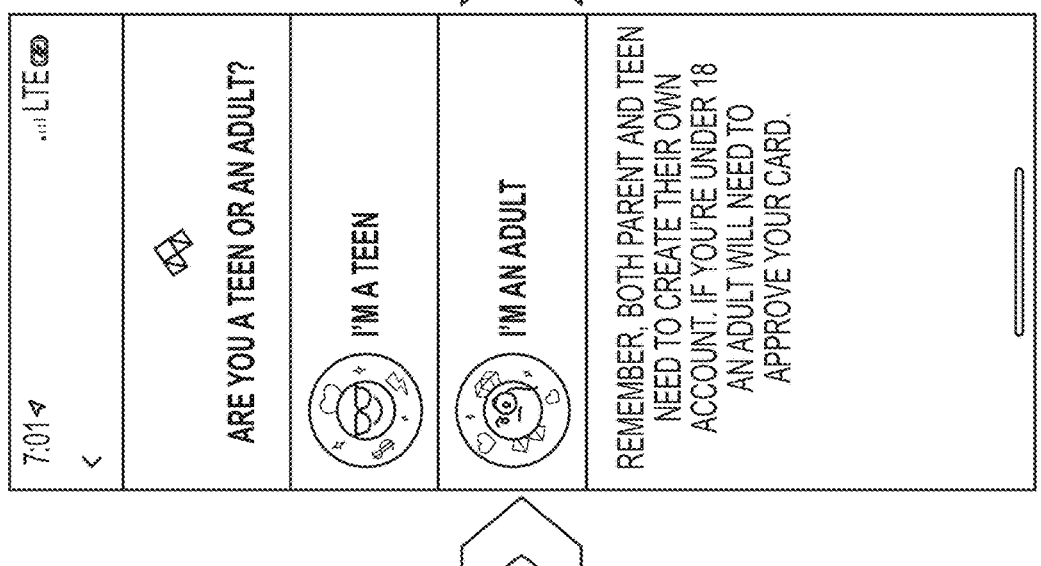
Figure 4A:
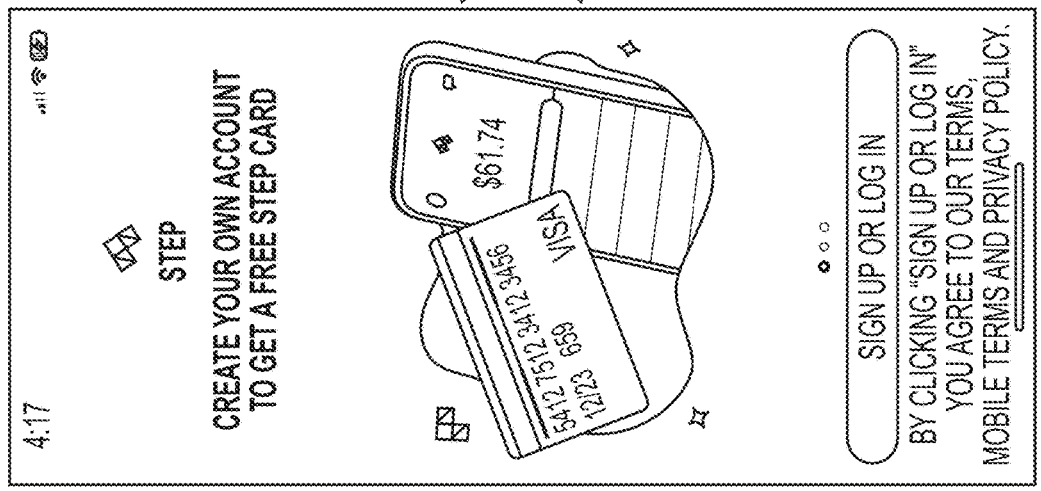
Figure 4G:
Figure 4F:
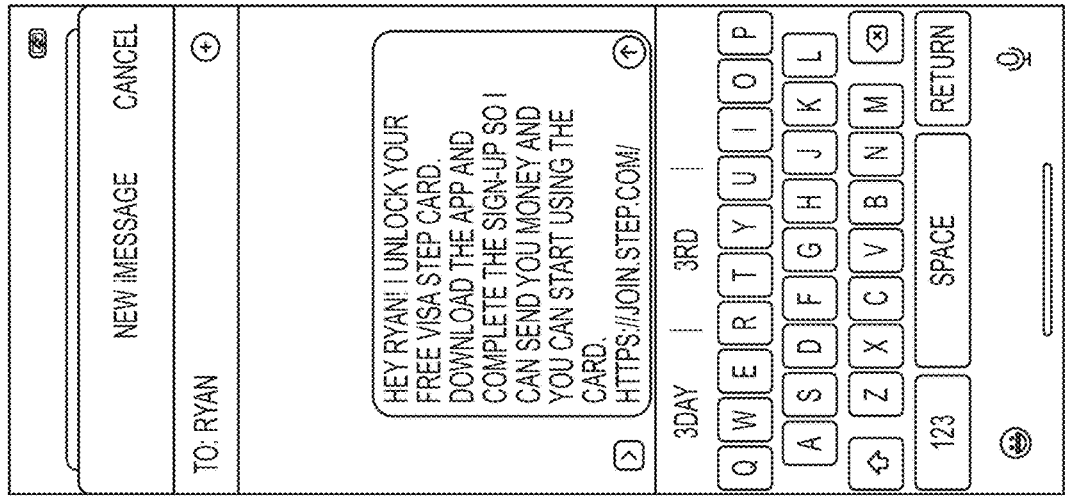
Figure 4H:
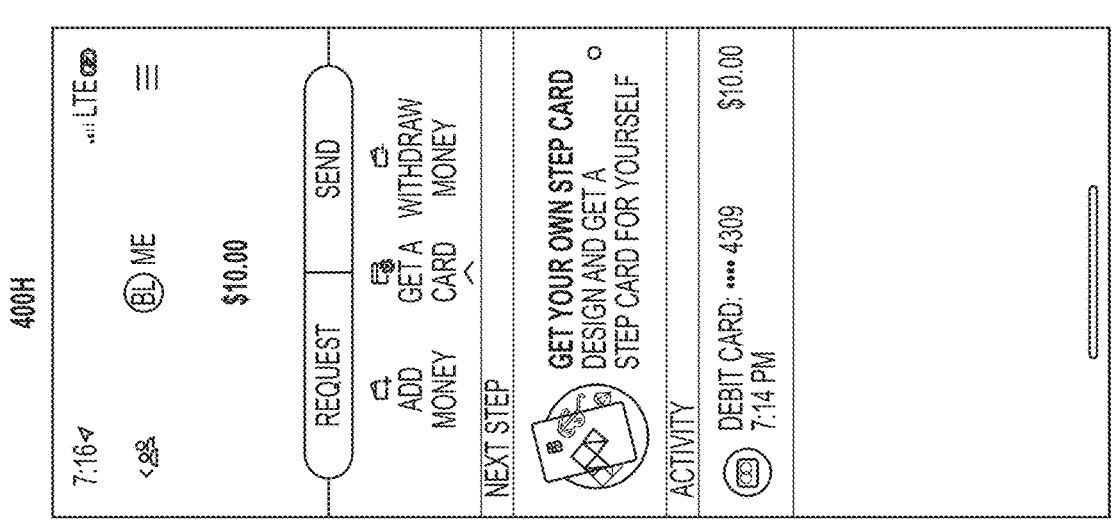
Figure 4I:
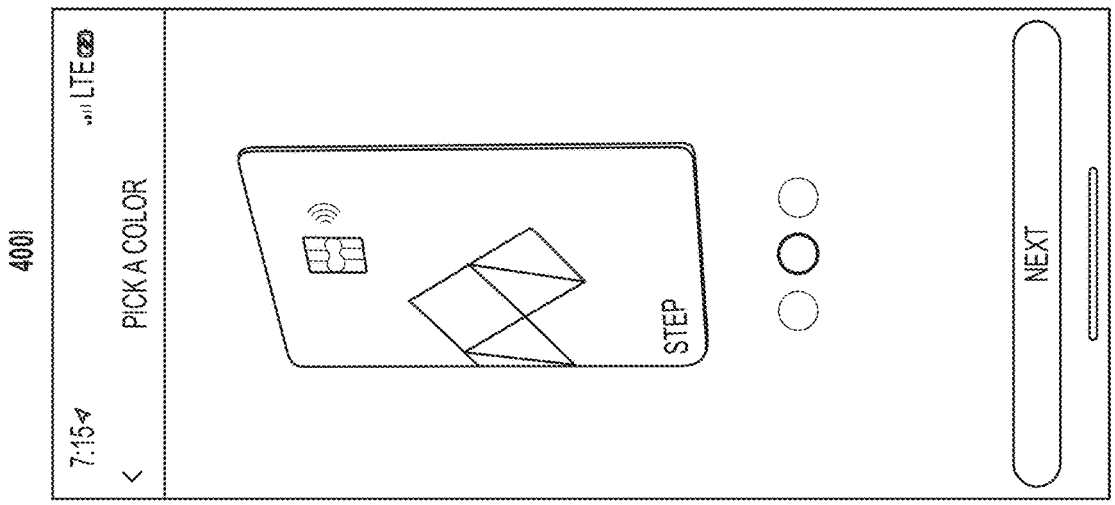
Figure 4K:
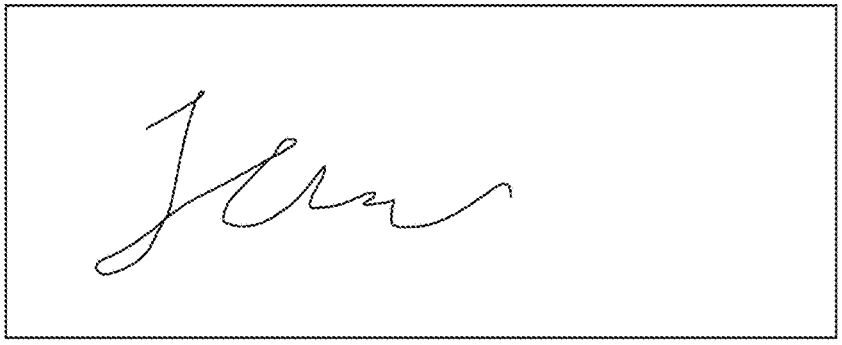
Figure 4J:
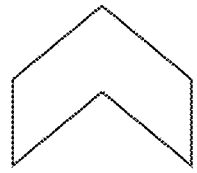
Figure 4J:
Figure 4M:
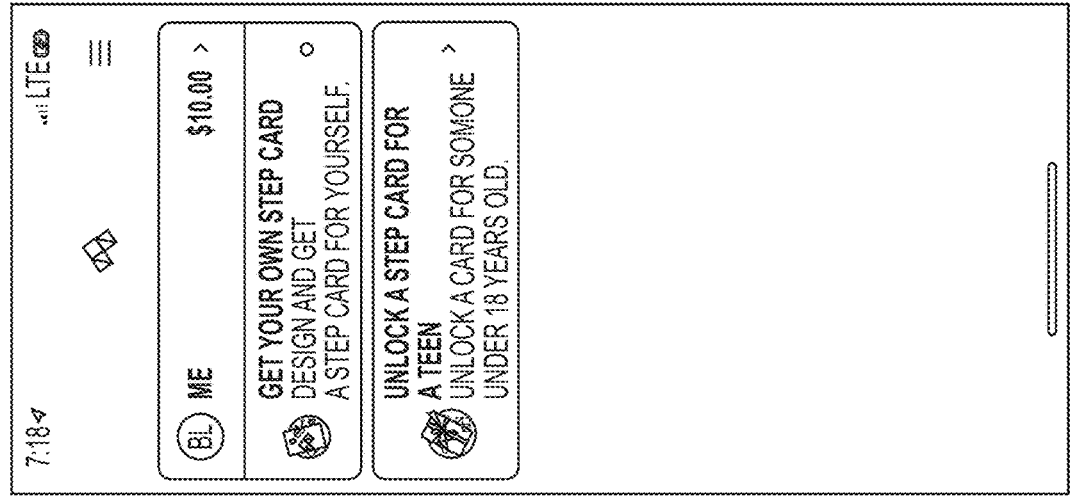
Figure 4L:
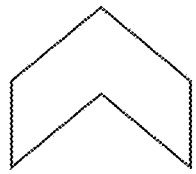
Figure 4L:
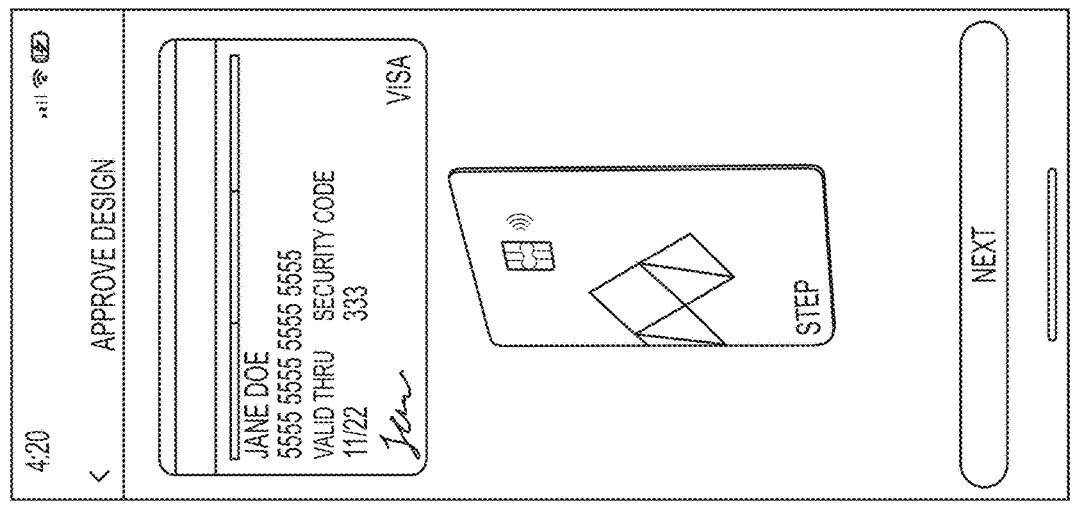
Figure 4R:
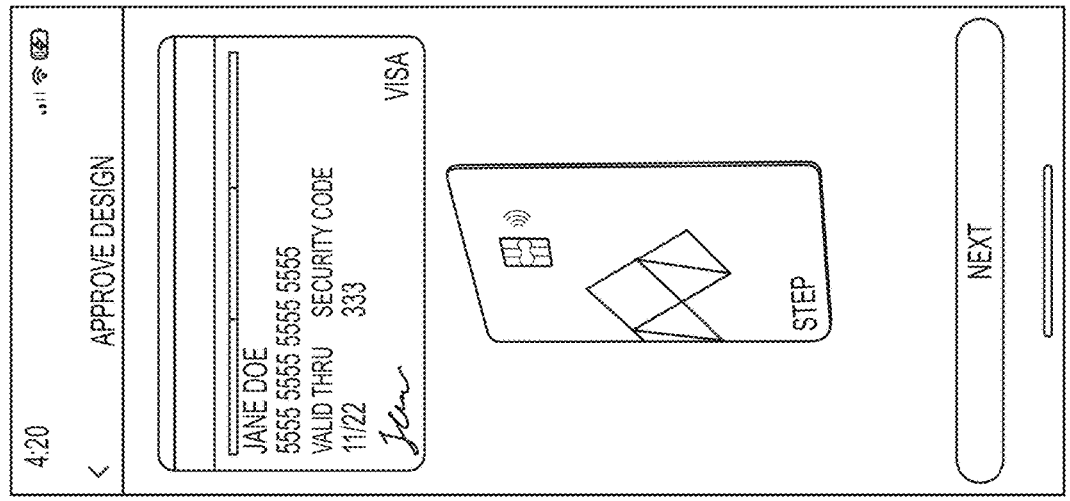
Figure 4Q:
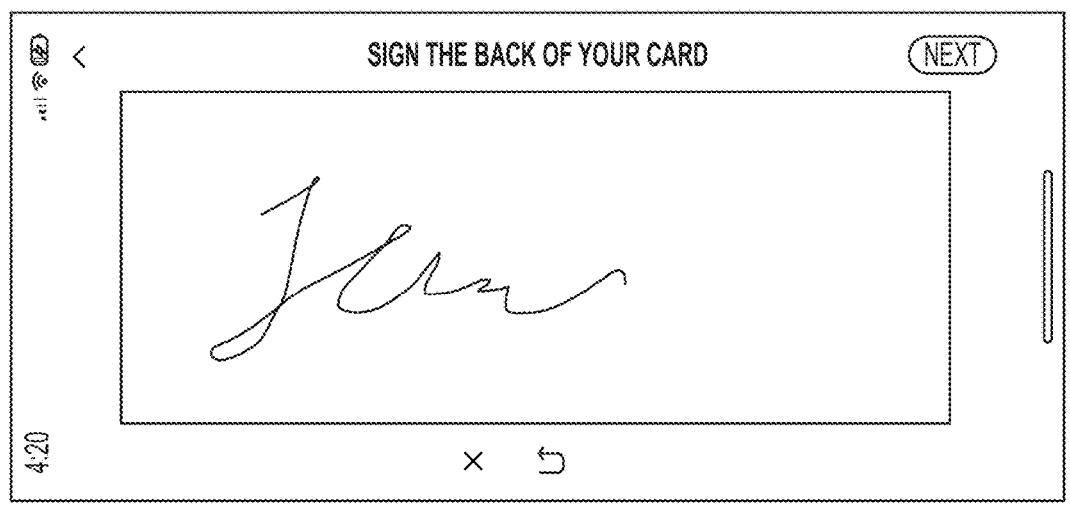
Figure 4S:
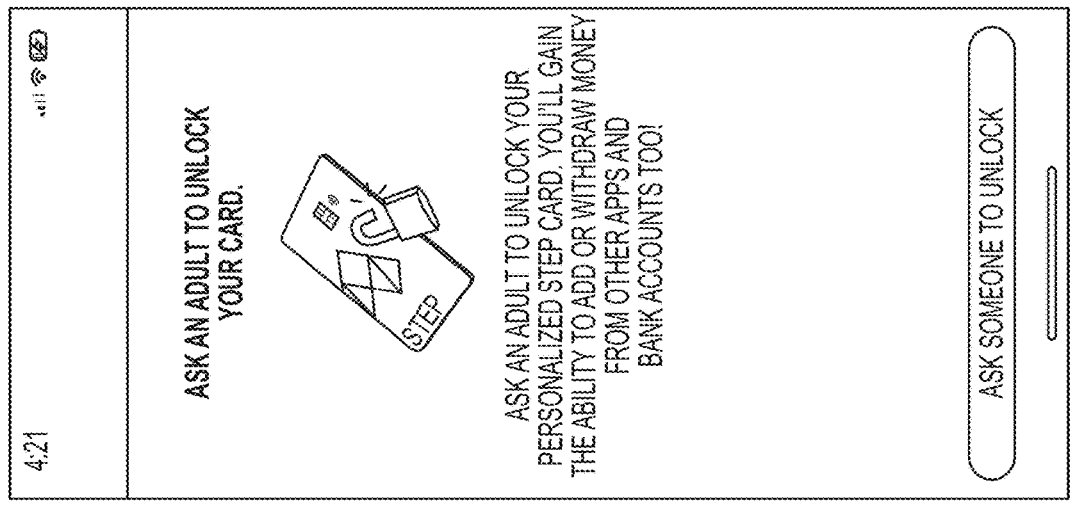
Figure 4T:
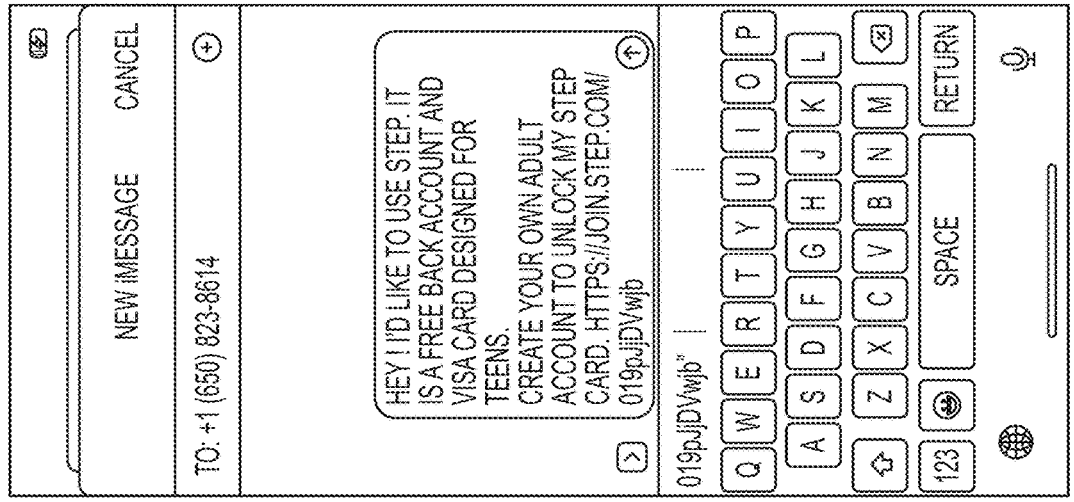
Figure 4V:
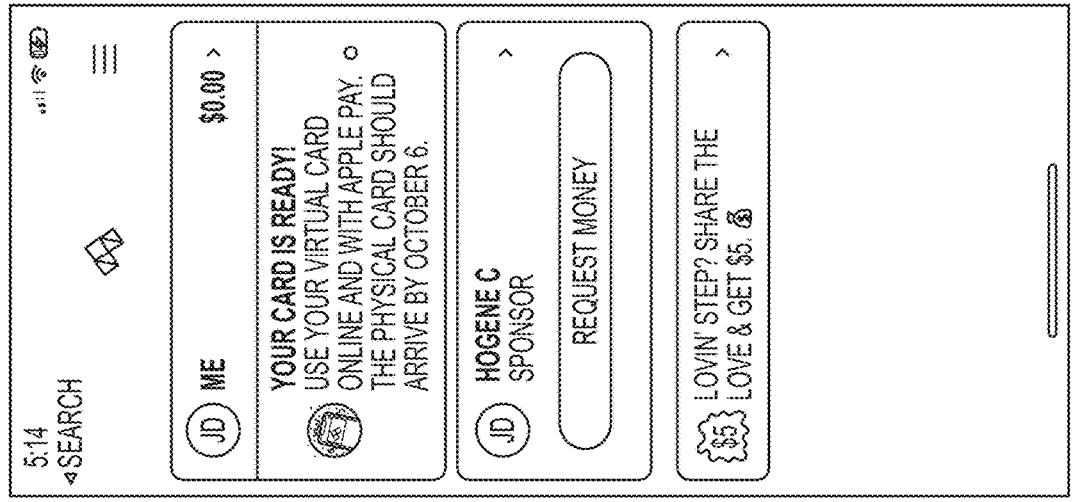
Figure 4U:
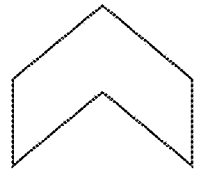
Figure 4U:
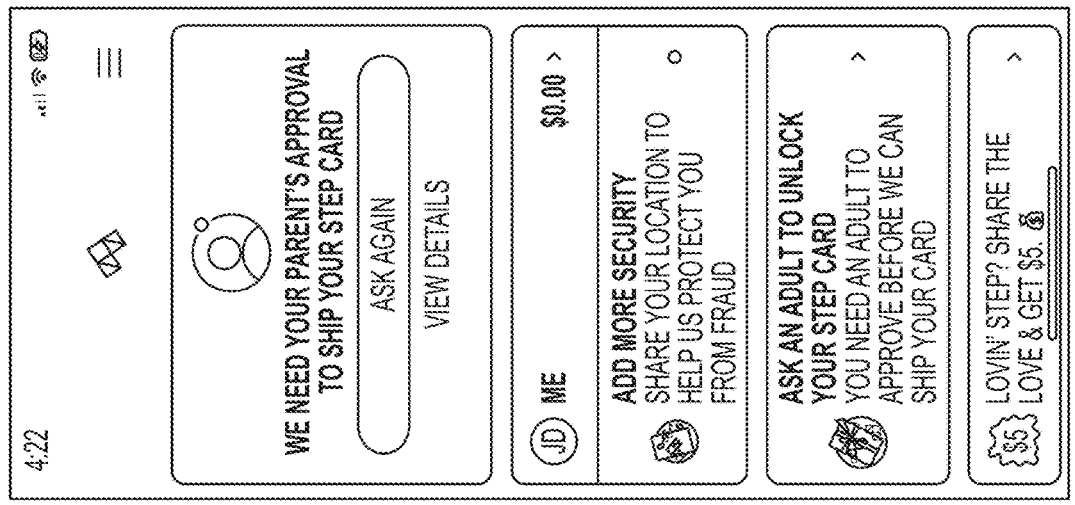

FIG. 3E illustrates a flow diagram of a method 300E for designing and assigning one or more virtual cards for a dependent user, in accordance with the presently disclosed embodiments. The method 300E may be performed utilizing one or more processing devices (e.g., electronic devices 104A, 104B or financial services platform 112) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user data, financial data, market data, transaction data, and so forth), software (e.g., instructions running/executing on one or more processors), firmware (e.g., microcode), or some combination thereof.

The method 300E may begin block 302E with the one or more processing devices (e.g., electronic devices 104A, 104B or financial services platform 112) receiving a request to create a dependent user account associated with a virtual spending card on the financial services platform. The method 300E may then continue at block 304E with the one or more processing devices (e.g., electronic devices 104A, 104B or financial services platform 112) causing an application executing on an electronic device of the dependent user to display a prompt to input a textual representation of identity data to appear on a first side of the virtual spending card associated with the dependent user account. The method 300E may then continue at block 306E with the one or more processing devices (e.g., electronic devices 104A, 104B or financial services platform 112), upon receiving the textual representation of identity data, causing the application to display a prompt to input one or more graphical representations of identity data to appear on a second side of the virtual spending card. The method 300E may then continue at block 308E with the one or more processing devices (e.g., electronic devices 104A, 104B or financial services platform 112) receiving, from the application, a graphical representation of identity data, the graphical representation of identity data corresponding to a user performance of one or more gestures to generate a unique signature for the dependent user. The method 300E may then conclude at block 310E with the one or more processing devices (e.g., electronic devices 104A, 104B or financial services platform 112 causing, by the application to display an appearance of the virtual spending card including the textual representation and the graphical representation.

FIG. 3F illustrates a flow diagram of a method 300F for designing and assigning one or more virtual cards for an independent user, in accordance with the presently disclosed embodiments. The method 300F may be performed utilizing one or more processing devices (e.g., electronic devices 104A, 104B or financial services platform 112) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user data, financial data, market data, transaction data, and so forth), software (e.g., instructions running/executing on one or more processors), firmware (e.g., microcode), or some combination thereof.

The method 300F may begin block 302F with the one or more processing devices (e.g., electronic devices 104A, 104B or financial services platform 112) receiving a request to create an independent user account to be associated with a dependent user account and each associated with a virtual spending card on the financial services platform. The method 300F may then continue at block 304F with the one or more processing devices (e.g., electronic devices 104A, 104B or financial services platform 112), after receiving the request to create the independent user account, causing an application executing on an electronic device of the independent user to display a prompt to input a textual representation of identity data to appear on a first side of the virtual spending card associated with the independent user account. The method 300F may then continue at block 306F with the one or more processing devices (e.g., electronic devices 104A, 104B or financial services platform 112), upon receiving the textual representation of identity data, causing the application to display a prompt to input one or more graphical representations of identity data to appear on a second side of the virtual spending card. The method 300F may then continue at block 308F with the one or more processing devices (e.g., electronic devices 104A, 104B or financial services platform 112) receiving, from the application, a graphical representation of identity data, the graphical representation of identity data corresponding to a user performance of one or more gestures to generate a unique signature for the independent user. The method 300F may then conclude at block 310F with the one or more processing devices (e.g., electronic devices 104A, 104B or financial services platform 112 causing, by the application to display an appearance of the virtual spending card including the textual representation and the graphical representation.

FIGS. 4A-4M illustrate one or more running examples of provisioning a platform account and prompting an authorized user to be joined to the platform account by creating a sub-account. As depicted by user interface 400A, a user may launch a financial services application on a mobile electronic device, for example. In response to selecting an affordance to sign-up for a user account with the financial services platform, a user interface 400B may be presented for allowing the user to select whether she is a teen or an adult. In response to a user selection of an affordance indicating adult, the user interface 400C may be presented. The user interface 400C may be presented to allow the user to confirm whether she intends to create a user account for herself or to sponsor a teen account. In response to a user selection of an affordance indicating that the user intends to sponsor a teen account, a user interface 400D may be presented for allowing the user to input her identity data (e.g., name, birthday, address, email, and so forth).

Upon the user's completion of inputting her identity data, the user interface 400E may be presented for prompting the user to unlock or provision a virtual spending account and a virtual spending card for a teen. In response to the user selecting an affordance corresponding to a selection to sponsor a teen and the user identifying the teen which she wishes to sponsor, an automated message or other automated notification may be automatically generated for the user to confirm to send to the intended teen user (as depicted by the user interface 400F) as an invite to the intended teen to create a user account on the financial services platform. In particular embodiments, while the user awaits the intended to teen to create their account, the user make one or more deposits to her account (as depicted by user interface 400G) or creating a virtual spending card as illustrated by user interface 400H. In response to a user selection of an affordance corresponding to a selection to create a virtual spending card, the user interface 400I may be presented.

In particular embodiments, the user may then be led through a design process to configure and personalize the virtual spending card in accordance with the desire of the user. For example, in one embodiment, the user may select one of a number of differing colors for her virtual spending card and corresponding physical spending card as illustrated by user interface 400I. After the user selects a color or other aesthetic effect, the user interface 400I may be then presented to allow the user to input identity information to be displayed on the virtual spending card and corresponding physical spending card. In response to the user inputting her identity information and selecting an affordance to confirm her identity information, the user interface 400K may be presented and prompt the user to virtually sign her virtual spending card (and as will be printed on the corresponding physical spending card).

For example, in particular embodiments, as illustrated by user interface 400K, the user may perform one or more touch gestures (e.g., one or more drag gestures, flick gestures, tap gestures, and so forth) on her mobile electronic device to scribble her signature in a manner such that the user's virtual signature is identical or nearly identical to her manually written signature. In response to the user selecting an affordance to confirm the image of her virtual signature on the virtual spending card, the user interface 400L may be presented to allow the user to confirm and approve the design of her virtual spending card and corresponding physical spending card. In some embodiments, the user interface 400M illustrates a menu screen that may be displayed once the user either makes a deposit or completes the design of her virtual spending card.

FIGS. 4N-4X illustrate one or more running examples of creating a sub-account and prompting an account owner to allow provisioning of the sub-account by creating and provisioning a platform account. As depicted by user interface 400N, a user may launch a financial services application on a mobile electronic device, for example. In response to selecting an affordance to sign-up for a user account with the financial services platform, a user interface 400O may be presented for allowing the user to select whether he is a teen or an adult. In response to a user selection of an affordance indicating teen, the user interface 400P may be presented. The user interface 400P may be presented to allow the user to begin designing his virtual spending card for his teen user account. In particular embodiments, the user may then be led through a design process to configure and personalize the virtual spending card in accordance with the desire of the user. For example, in one embodiment, the user may select one of a number of differing colors for his virtual spending card and corresponding physical spending card as illustrated by user interface 400I. After the user selects a color or other aesthetic effect, the user interface 400Q may be presented and prompt the user to virtually sign her virtual spending card (and as will be printed on the corresponding physical spending card).

For example, in particular embodiments, as illustrated by user interface 400K, the user may perform one or more touch gestures (e.g., one or more drag gestures, flick gestures, tap gestures, and so forth) on her mobile electronic device to scribble his signature in a manner such that the user's virtual signature is identical or nearly identical to his manually written signature. In response to the user selecting an affordance to confirm the image of his virtual signature on the virtual spending card, the user interface 400R may be presented to allow the user to confirm and approve the design of his virtual spending card and corresponding physical spending card. In particular embodiments, upon the user completing the design of his virtual spending card and corresponding physical spending card, the user interface 400S may be presented for allowing to provide a request for an adult to sponsor his teen user account and unlock his virtual spending card for use.

In response to the user selecting an affordance corresponding to a selection to request a sponsor and the user identifying his desired sponsor, an automated message or other automated notification may be automatically generated for the user to confirm to send to the desired sponsor user or other adult user (as depicted by the user interface 400T) as an invite to the adult user to sponsor teen user account. In particular embodiments, while the user awaits the intended to teen to create their account, the user make one or more deposits to her account (as depicted by user interface 400G) or creating a virtual spending card as illustrated by user interface 400H. In response to a user selection of an affordance corresponding to a selection to create a virtual spending card, the user interface 400I may be presented.

In particular embodiments, the user may be also presented with a user interface 400U including an affordance for selecting to remind the desired sponsor user to sponsor the teen user account. In response to the requested sponsor user selecting to sponsor the teen user account, the user interface 400V may be presented, including a notification that the user's virtual spending card is approved for use. The user may be then be allowed to request the sponsor user to allocate funds to the spending card account of the user in order to utilize the virtual spending card or corresponding physical card to execute transactions (as depicted by the user interface 400W). In response to the user confirming his request for an allocation of funds, the user interface 400X may be presented, including a notification indicating that the user's request for funds have been provided to the sponsor user.

Figure 5:
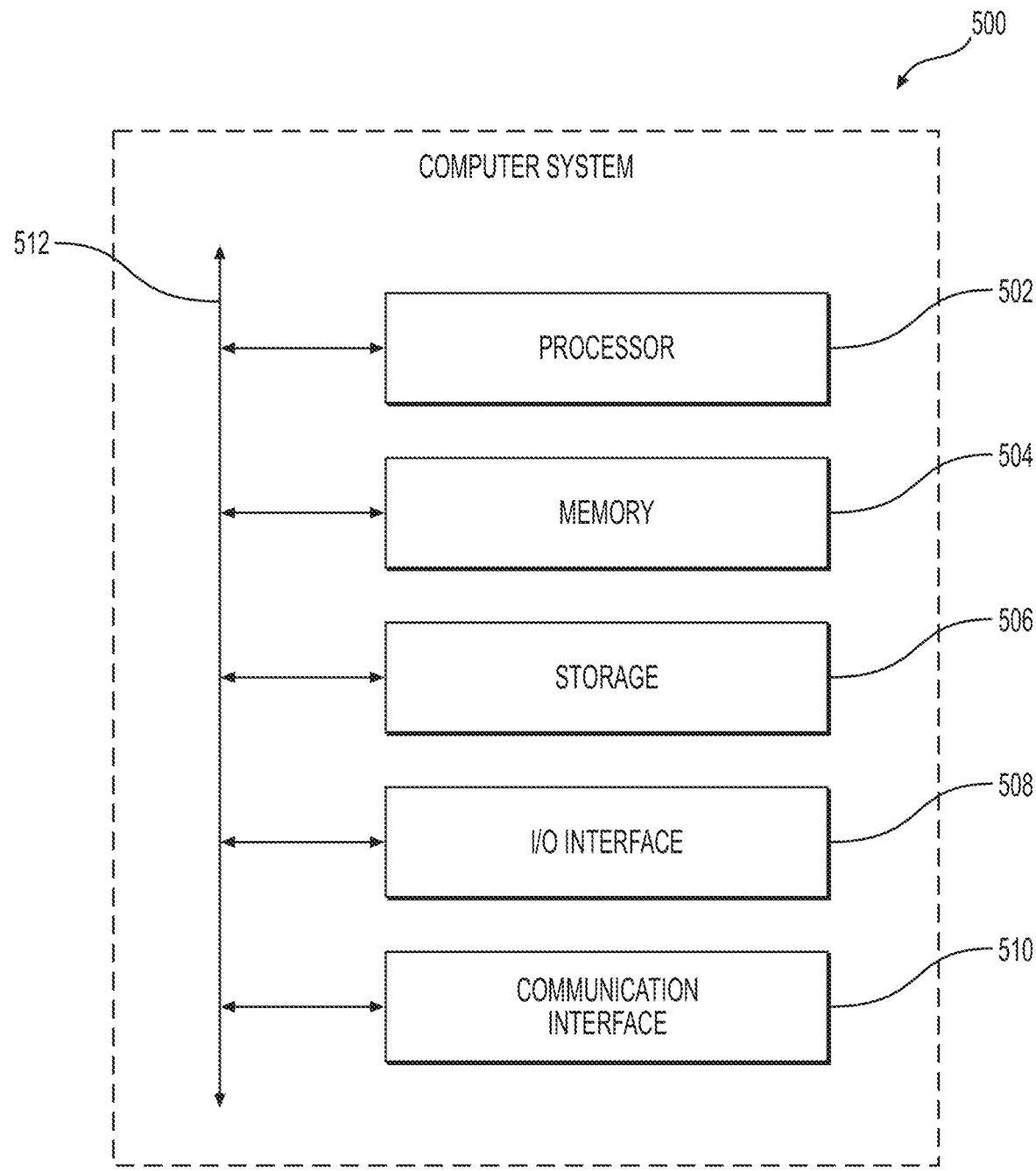
FIG. 5 illustrates an example financial services computing system included as part of the financial services platform.

FIG. 5 illustrates an example financial services computing system 500 (which may be included as part of the financial services platform 112) that may be utilized for provisioning a platform account and associated sub-account and servicing transactions utilizing the provisioned platform account and associated sub-account, in accordance with the presently disclosed embodiments. In particular embodiments, one or more financial services computing system 500 perform one or more steps of one or more methods described or illustrated herein. In particular embodiments, one or more financial services computing system 500 provide functionality described or illustrated herein. In particular embodiments, software running on one or more financial services computing system 500 performs one or more steps of one or more methods described or illustrated herein or provides functionality described or illustrated herein. Particular embodiments include one or more portions of one or more financial services computing system 500. Herein, reference to a computer system may encompass a computing device, and vice versa, where appropriate. Moreover, reference to a computer system may encompass one or more computer systems, where appropriate.

This disclosure contemplates any suitable number of financial services computing systems 500. This disclosure contemplates computer system 500 taking any suitable physical form. As example and not by way of limitation, computer system 500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more financial services computing system 500; be unitary or distributed; span multiple locations; span multiple machines; span multiple data centers; or reside in a cloud, which may include one or more cloud components in one or more networks.

Where appropriate, one or more financial services computing system 500 may perform without substantial spatial or temporal limitation one or more steps of one or more methods described or illustrated herein. As an example, and not by way of limitation, one or more financial services computing system 500 may perform in real time or in batch mode one or more steps of one or more methods described or illustrated herein. One or more financial services computing system 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 810, and a bus 512. Although this disclosure describes and illustrates a particular computer system having a particular number of particular components in a particular arrangement, this disclosure contemplates any suitable computer system having any suitable number of any suitable components in any suitable arrangement. In particular embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502.

Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 802. Although this disclosure describes and illustrates a particular processor, this disclosure contemplates any suitable processor.

In particular embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memory devices 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 506 for them. Where appropriate, I/O interface 508 may include one or more device or software drivers enabling processor 502 to drive one or more of these I/O devices. I/O interface 508 may include one or more I/O interfaces 506, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 500 and one or more other computer systems 500 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 512 includes hardware, software, or both coupling components of computer system 500 to each other. As an example, and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

FIG. 6 illustrates a diagram 600 of an example artificial intelligence (AI) architecture 602 (which may be included as part of the financial services platform 112) that may be utilized for provisioning a platform account and associated sub-account and servicing transactions utilizing the provisioned platform account and associated sub-account, in accordance with the presently disclosed embodiments. In particular embodiments, the AI architecture 602 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 6, the AI architecture 602 may include machine learning (ML) algorithms and functions 604, natural language processing (NLP) algorithms and functions 606, expert systems 608, computer-based vision algorithms and functions 610, speech recognition algorithms and functions 612, planning algorithms and functions 614, and robotics algorithms and functions 616. In particular embodiments, the ML algorithms and functions 604 may include any statistics-based algorithms that may be suitable for finding patterns across large amounts of data (e.g., "Big Data" such as user click data or other user interactions, financial data, market data, transaction data, text data, image data, video data, audio data, speech data, numbers data, and so forth). For example, in particular embodiments, the ML algorithms and functions 604 may include deep learning algorithms 618, supervised learning algorithms 620, and unsupervised learning algorithms 622.

In particular embodiments, the deep learning algorithms 618 may include any artificial neural networks (ANNs) that may be utilized to learn deep levels of representations and abstractions from large amounts of data. For example, the deep learning algorithms 618 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 620 may include any algorithms that may be utilized to apply, for example, what has been learned in the past to new data using labeled examples for predicting future events. For example, starting from the analysis of a known training dataset, the supervised learning algorithms 620 may produce an inferred function to make predictions about the output values. The supervised learning algorithms 620 can also compare its output with the correct and intended output and find errors in order to modify the supervised learning algorithms 620 accordingly. On the other hand, the unsupervised learning algorithms 622 may include any algorithms that may applied, for example, when the data used to train the unsupervised learning algorithms 622 are neither classified nor labeled. For example, the unsupervised learning algorithms 622 may study and analyze how systems may infer a function to describe a hidden structure from unlabeled data.

In particular embodiments, the NLP algorithms and functions 606 may include any algorithms or functions that may be suitable for automatically manipulating natural language, such as speech and/or text. For example, in some embodiments, the NLP algorithms and functions 606 may include content extraction algorithms or functions 624, classification algorithms or functions 626, machine translation algorithms or functions 628, question answering (QA) algorithms or functions 630, and text generation algorithms or functions 632. In particular embodiments, the content extraction algorithms or functions 624 may include a means for extracting text or images from electronic documents (e.g., webpages, text editor documents, and so forth) to be utilized, for example, in other applications.

In particular embodiments, the classification algorithms or functions 626 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 628 may include any algorithms or functions that may be suitable for automatically converting source text in one language, for example, into text in another language. The QA algorithms or functions 630 may include any algorithms or functions that may be suitable for automatically answering questions posed by humans in, for example, a natural language, such as that performed by voice-controlled personal assistant devices. The text generation algorithms or functions 632 may include any algorithms or functions that may be suitable for automatically generating natural language texts.

In particular embodiments, the expert systems 608 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 610 may include any algorithms or functions that may be suitable for automatically extracting information from images (e.g., photo images, video images). For example, the computer-based vision algorithms and functions 610 may include image recognition algorithms 634 and machine vision algorithms 636. The image recognition algorithms 634 may include any algorithms that may be suitable for automatically identifying and/or classifying objects, places, people, and so forth that may be included in, for example, one or more image frames or other displayed data. The machine vision algorithms 636 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 612 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 614 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 616 may include any algorithms, functions, or systems that may enable one or more devices to replicate human behavior through, for example, motions, gestures, performance tasks, decision-making, emotions, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to this disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising, by one or more computer servers associated with a financial services platform:
generating, by the one or more computer servers, and within a data store maintained by the financial services platform, an account for a dependent user, wherein the account is generated based on an account request received from the dependent user via a payment application associated with the financial services platform and executing on a first computing device of the dependent user, and wherein the financial services platform is configured to process financial transactions for the dependent user utilizing the account based on interactions of the dependent user within the payment application;
receiving, by the one or more computer servers, in conjunction with the account request, a payment card request from the dependent user for a payment card to be associated with the account of the dependent user;
in conjunction with the request for a payment card, receiving, by the one or more computer servers, and from the payment application, an electronic contact address of a sponsor user identified by the dependent user and entered by the dependent user into the payment application;

transmitting, by the one or more computer servers, a message to a second computing device associated with the electronic contact address of the sponsor user, the message including a link to access and establish a sponsor user account for the sponsor user with the financial services platform and establish a sponsor user account within the data store maintained by the financial services platform;

maintaining, by the one or more computer servers, an account status of the sponsor user and in conjunction with an account status of the dependent user;

prior to the one or more computer servers receiving a confirmation that the sponsor user has established the sponsor user account with the financial services platform, controlling, by the one or more computer servers, access options for the dependent user with the financial services platform to a first level, the first level including not providing access to the payment card to be associated with the account of the dependent user;

subsequent to the one or more computer servers receiving a confirmation that the sponsor user has established the sponsor payment account with the financial services platform, updating, by the one or more computer servers, the access options for the dependent user with the financial services platform to an second level, the second level including approving a provisioning of a payment card to be associated with the account of the dependent user;

upon receipt by the one or more computer servers that both the account of the dependent user and the sponsor user account have been established and linked with each other, provisioning, by the one or more computer servers, a virtual payment card for the account of the dependent user for virtual storage and use by the dependent user to service financial transactions; and in parallel:
transmitting, by the one or more computer servers, instructions to cause a physical payment card for the dependent user to be printed and associated with the account of the dependent user; and
activating, by the one or more computer servers, the physical payment card with the financial services platform upon confirmation of receipt by the dependent user within the payment application.

2. The method of claim 1, wherein the dependent user comprises a user under a legal age for provisioning a sponsor user account.

3. The method of claim 1, further comprising:
receiving, by the one or more computer servers, and from a second application associated with the financial services platform and executing on the second computing device, the confirmation that the sponsor user has established the sponsor user account.

4. The method of claim 1, further comprising:
receiving, by the one or more computer servers, a request for an amount of funds to satisfy a transaction initiated with respect to the virtual payment card; and
determining, by the one or more computer servers, whether the request for the amount of funds can be satisfied by at least a portion of funds held in a deposit account associated with the sponsor user account and maintained with the financial services platform.

5. The method of claim 4, further comprising:
in response to determining that the request for the amount of funds can be satisfied by at least the portion of the funds held in the deposit account, updating, by the one or more computer servers, one or more entries of a platform ledger associated with the with the sponsor user account and the account of the dependent user to reflect an increase in the balance of the virtual payment card in accordance with a value of the amount of funds to satisfy the request for the amount of funds.

6. The method of claim 1, further comprising receiving, by the one or more computer servers, a deposit amount corresponding to an amount of the funds held in the deposit account.

7. The method of claim 6, further comprising determining, by the one or more computer servers, and based on the amount of the funds held in the deposit account, a spending limit for the virtual payment card and the physical payment card.

8. The method of claim 7, further comprising:
determining, by the one or more computer servers, and using a platform ledger associated with the with the sponsor payment account and the account of the dependent user, an account history of the virtual payment card and the physical payment card, the account history including transaction activity of the dependent user evaluated based on: 1) the spending limit and 2) the balance of the virtual payment card and the physical payment card upon conclusion of one or more spending-reconciliation cycles;
determining, by the one or more computer servers, and based on the account history, one or more credit history markers for the dependent user; and
generating, by the one or more computer servers, and based on the one or more credit history markers, a credit history report for the dependent user.

9. The method of claim 8, wherein the spending limit varies based at least in part on the amount of the funds held in the deposit account.

10. The method of claim 8, wherein the credit history report for the dependent user does not affect a credit history for the sponsor user.

11. The method of claim 8, wherein determining the one or more credit history markers for the dependent user comprises determining, by the one or more computer servers, a credit utilization for the dependent user for each of a plurality of spending-reconciliation cycles.

12. The method of claim 8, wherein generating the credit history report for the dependent user comprises generating, by the one or more computer servers, a credit history report for the dependent user based on a previous 24 spending-reconciliation cycles.

13. The method of claim 1, further comprising:
prior to provisioning the virtual payment card for the account of the dependent user:
causing, by the one or more computer servers, the application executing on the first computing device to display a prompt to input a textual representation of identity data to appear on a first side of the virtual payment card associated with the dependent user account;
upon receiving the textual representation of identity data, causing, by the one or more computer servers, the application to display a prompt to input one or more graphical representations of identity data to appear on a second side of the virtual payment card;

receiving, by the one or more computer servers, and from the application, a graphical representation of identity data, the graphical representation of identity data corresponding to a user performance of one or more gestures to generate a unique signature for the dependent user; and causing, by the one or more computer servers, the application to display an appearance of the virtual payment card including the textual representation and the graphical representation.

14. The method of claim 13, further comprising causing, by the one or more computer servers, the application executing on the first computing device to display the prompt to input the textual representation of identity data after receiving approval of a request to provision the dependent user account on the financial services platform.

15. The method of claim 13, wherein an account number associated with the virtual payment card is different from an account number associated with a mobile wallet version of the virtual payment card.

16. The method of claim 15, wherein the virtual payment card is configured to be activated for discretionary use by the dependent user while the physical payment card remains electronically deactivated for a period of time.

17. One or more computer servers associated with a financial services platform, comprising:
one or more non-transitory computer-readable storage media including instructions; and
one or more processors coupled to the one or more storage media, the one or more processors configured to execute the instructions to:
generate, within a data store maintained by the financial services platform, an account for a dependent user, wherein the account is generated based on an account request received from the dependent user via a payment application associated with the financial services platform and executing on a first computing device of the dependent user, and wherein the financial services platform is configured to process financial transactions for the dependent user utilizing the account based on interactions of the dependent user within the payment application;
receive, in conjunction with the account request, a payment card request from the dependent user for a payment card to be associated with the account of the dependent user;
in conjunction with the request for a payment card, receive, from the payment application, an electronic contact address of a sponsor user identified by the dependent user and entered by the dependent user into the payment application;
transmit a message to a second computing device associated with the electronic contact address of the sponsor user, the message including a link to access and establish a sponsor user account for the sponsor user with the financial services platform and establish a sponsor user account within the data store maintained by the financial services platform;
maintain an account status of the sponsor user and in conjunction with an account status of the dependent user;
prior to the one or more computer servers receiving a confirmation that the sponsor user has established the sponsor user account with the financial services platform, control, access options for the dependent user with the financial services platform to a first level, the first level including not providing access to the payment card to be associated with the account of the dependent user;
subsequent to the one or more computer servers receiving a confirmation that the sponsor user has established the sponsor payment account with the financial services platform, update the access options for the dependent user with the financial services platform to an second level, the second level including approving a provisioning of a payment card to be associated with the account of the dependent user;
upon receipt by the one or more computer servers that both the account of the dependent user and the sponsor user account have been established and linked with each other, provision the payment card for the account of the dependent user to service financial transactions in conjunction with the account of the dependent user, wherein the payment card is provisioned as: (1) a virtual payment card for the account of the dependent user for virtual storage and concurrent use by the dependent user to service financial transactions; and (2) a physical payment card to be printed and associated with the account of the dependent user, wherein the physical payment card is activated by the one or more computer servers upon confirmation of receipt by the dependent user within the payment application.

18. A non-transitory computer-readable medium comprising instructions that, when executed by one or more computer servers associated with a financial services platform, cause the one or more computer servers to:
generate, within a data store maintained by the financial services platform, an account for a dependent user, wherein the account is generated based on an account request received from the dependent user via a payment application associated with the financial services platform and executing on a first computing device of the dependent user, and wherein the financial services platform is configured to process financial transactions for the dependent user utilizing the account based on interactions of the dependent user within the payment application;
receive, in conjunction with the account request, a payment card request from the dependent user for a payment card to be associated with the account of the dependent user;
in conjunction with the request for a payment card, receive, from the payment application, an electronic contact address of a sponsor user identified by the dependent user and entered by the dependent user into the payment application;
transmit a message to a second computing device associated with the electronic contact address of the sponsor user, the message including a link to access and establish a sponsor user account for the sponsor user with the financial services platform and establish a sponsor user account within the data store maintained by the financial services platform;
maintain an account status of the sponsor user and in conjunction with an account status of the dependent user;
prior to the one or more computer servers receiving a confirmation that the sponsor user has established the sponsor user account with the financial services platform, control, access options for the dependent user with the financial services platform to a first level, the first level including not providing access to the payment card to be associated with the account of the dependent user;

subsequent to the one or more computer servers receiving a confirmation that the sponsor user has established the sponsor payment account with the financial services platform, update the access options for the dependent user with the financial services platform to an second level, the second level including approving a provisioning of a payment card to be associated with the account of the dependent user;

upon receipt by the one or more computer servers that both the account of the dependent user and the sponsor user account have been established and linked with each other, provision the payment card for the account of the dependent user to service financial transactions in conjunction with the account of the dependent user, wherein the payment card is provisioned as: (1) a virtual payment card for the account of the dependent user for virtual storage and concurrent use by the dependent user to service financial transactions; and (2) a physical payment card to be printed and associated with the account of the dependent user, wherein the physical payment card is activated by the one or more computer servers upon confirmation of receipt by the dependent user within the payment application.

* * * * *